US011792618B2

(12) United States Patent
Falla Cepeda

(10) Patent No.: US 11,792,618 B2
(45) Date of Patent: Oct. 17, 2023

(54) METHOD, APPARATUS, AND SYSTEM FOR BUILDING SINGLE-PATH COMMUNICATION SIGNAL MAP DATA FOR ROAD LINKS

(71) Applicant: HERE Global B.V., Eindhoven (NL)

(72) Inventor: David Falla Cepeda, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 123 days.

(21) Appl. No.: 17/240,607

(22) Filed: Apr. 26, 2021

(65) Prior Publication Data

US 2022/0345859 A1 Oct. 27, 2022

(51) Int. Cl.
*H04W 4/40* (2018.01)
*H04W 4/38* (2018.01)
*H04W 24/08* (2009.01)
*H04B 17/364* (2015.01)

(52) U.S. Cl.
CPC .............. *H04W 4/40* (2018.02); *H04W 4/38* (2018.02); *H04W 24/08* (2013.01); *H04B 17/364* (2015.01)

(58) Field of Classification Search
None
See application file for complete search history.

(56) References Cited

U.S. PATENT DOCUMENTS

| 2012/0059578 | A1* | 3/2012 | Venkatraman | ......... G01C 21/20 |
| | | | | 701/411 |
| 2019/0053296 | A1 | 2/2019 | Balappanavar et al. | |

FOREIGN PATENT DOCUMENTS

GB 2535784 A 8/2016

OTHER PUBLICATIONS

4MENDOLA et al., "5G for Connected and Automated Road Mobility in the European UnioN", Deliverable D2.1 5G CARMEN Use Cases and Requirement. retrieved from https://5gcarmen.eu/wp-content/uploads/2020/03/5G_CARMEN_D2.1_FINAL.pdf, May 13, 2019, 94 pages.
Office Action for related European Patent Application No. 22169443.3-1009, dated Sep. 12, 2022, 13 pages.
U. A. Del Peral-Rosado et al., "Exploitation of 3D City Maps for Hybrid 5G RTT and GNSS Positioning Simulations," ICASSP 2020-2020 IEEE International Conference on Acoustics, Speech and Signal Processing (ICASSP), 2020, pp. 9205-9209.

* cited by examiner

*Primary Examiner* — Adolf Dsouza
(74) *Attorney, Agent, or Firm* — Jason Wejnert; HERE GLOBAL B.V.

(57) ABSTRACT

An approach is provided for building single-path communication signal map data for road links. The approach involves, for example, using, by one or more processors, map data and/or vehicle sensor data to make a determination that one or more single-path communication signals are detectable on a particular road link or on one or more portions of the particular road link. The approach also involves, based on the determination, generating or storing, by the one or more processors, a road-link map attribute indicating that one or more single-path communication signals are detectable on the particular road link or on the one or more portions. The approach further involves, based at least on the road-link map attribute, providing, by the one or more processors, coverage information indicating that one or more single-path communication signals are detectable on the particular road link or on the one or more portions.

19 Claims, 15 Drawing Sheets

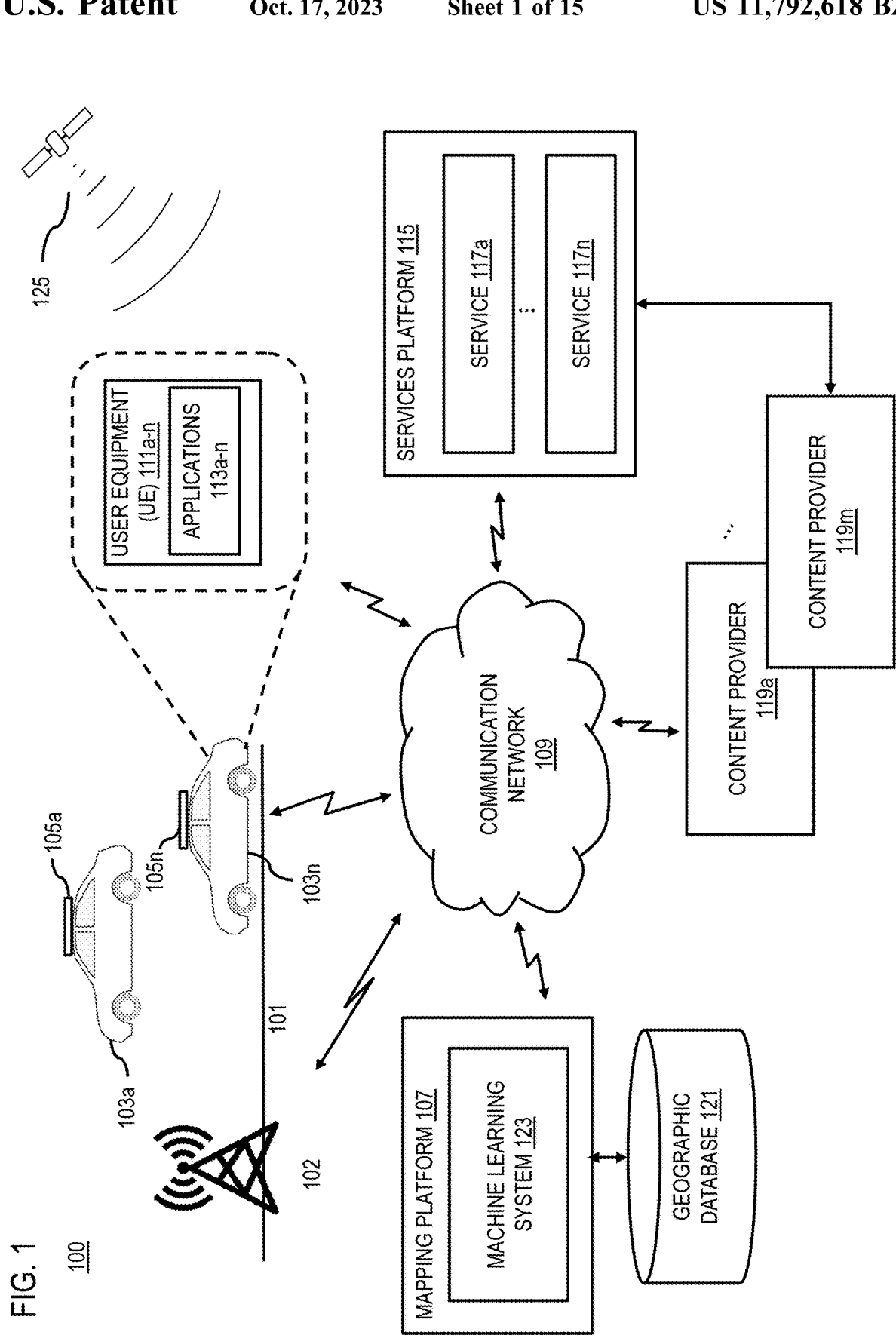

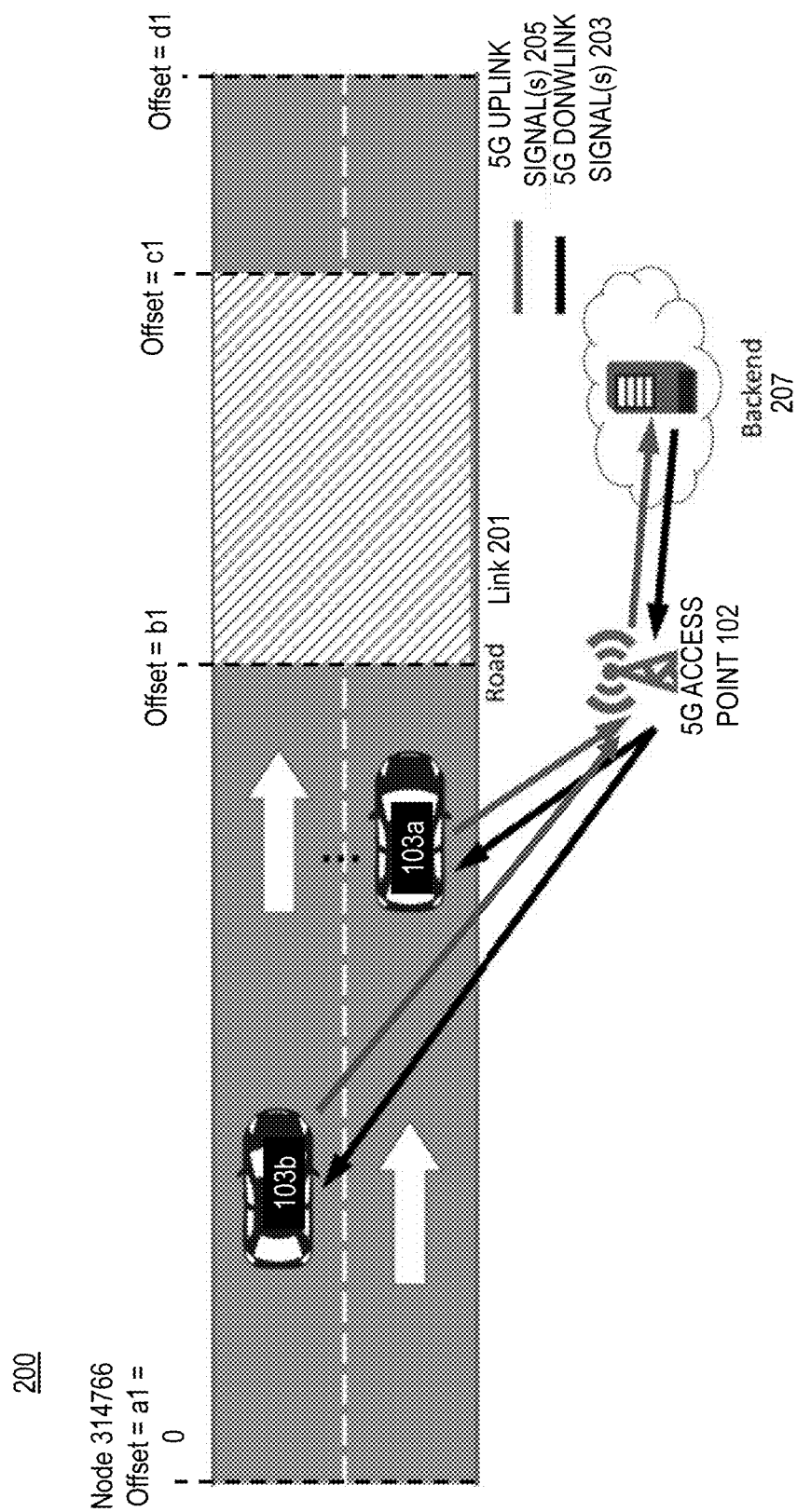

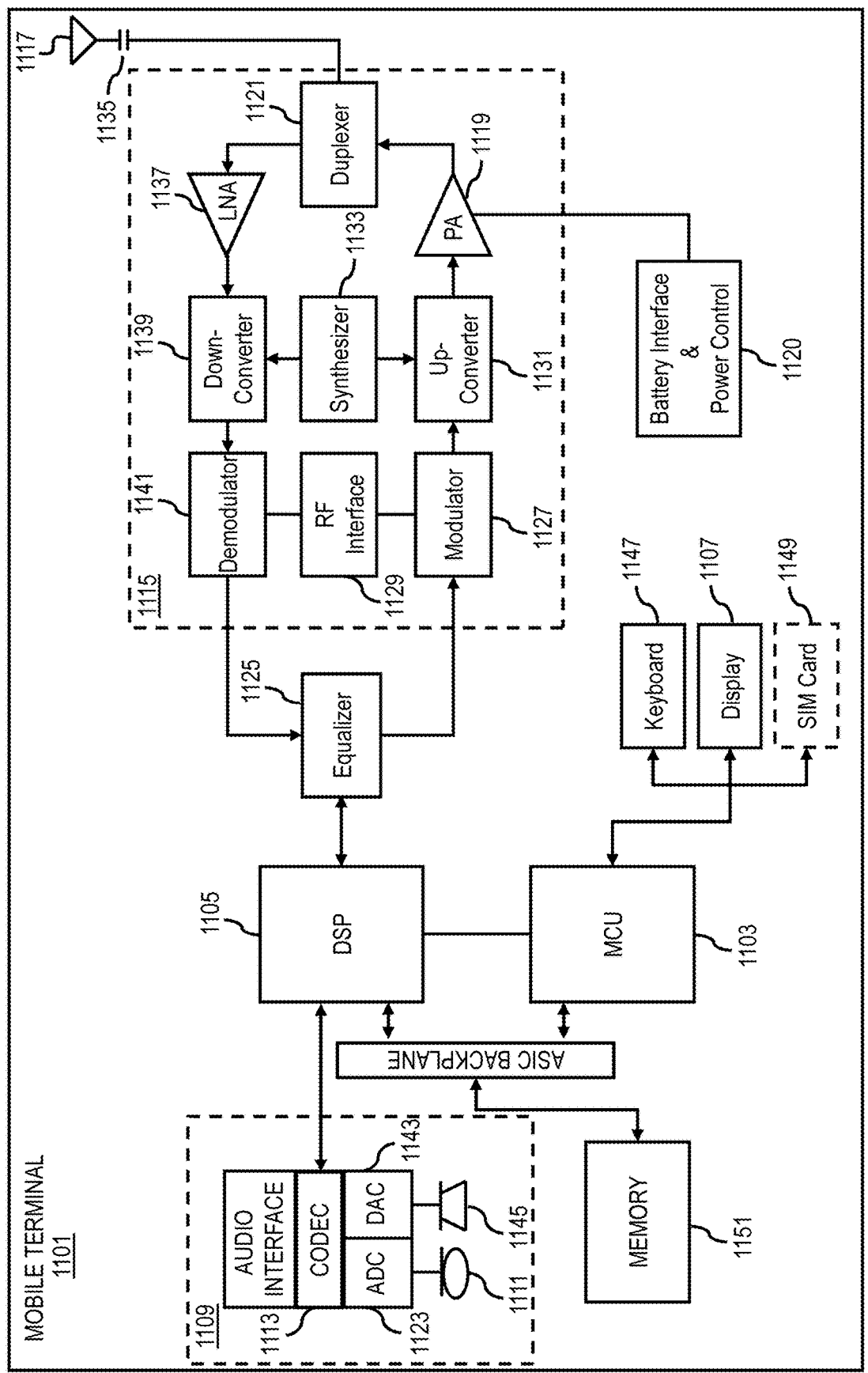

METHOD, APPARATUS, AND SYSTEM FOR BUILDING SINGLE-PATH COMMUNICATION SIGNAL MAP DATA FOR ROAD LINKS

BACKGROUND

The increasing number of connected vehicles represents a challenge for managing available high-speed communication bandwidth. The demand for high-speed data networks (including 5G networks) is high, and connected/autonomous vehicles will become the biggest consumers of such bandwidth. Management of 5G signal strength thus becomes important to ensure that the maximal data bandwidth is available for most participating entities (e.g., self-driving vehicles, passengers, etc.). Some 5G network service providers mark 2/3/4/5G available areas as polygons or geofences on online metropolitan area maps. However, these online maps are static and not readily accessible for applications such as vehicle navigation, autonomous driving, etc. In addition, these maps show a theoretical coverage from a cell site, instead of an actual coverage vehicles are experiencing when travelling on roads. Moreover, these maps require map-matching a vehicle location to a 5G-covered polygon or using complex functions to match the 5G-covered polygon to road geometry that consume time and computation resources. Accordingly, 5G network service providers and mapping service providers face significant technical challenges to identify and provide timely and accurate 5G signal coverage map data.

Some Example Embodiments

Therefore, there is a need for an approach for building single-path communication signal map data for road links (e.g., indicating single-path communication signals are detectable on a particular road link or on one or more portions thereof).

According to example embodiment(s), a method comprises using, by one or more processors, one or more of map data or vehicle sensor data to make a determination that one or more single-path communication signals are detectable on a particular road link or on one or more portions thereof. The method further comprises, based on the determination, generating or storing, by the one or more processors, a road-link map attribute indicating that one or more single-path communication signals are detectable on the particular road link or on the one or more portions thereof. The method further comprises, based at least on the road-link map attribute, providing, by the one or more processors, coverage information indicating that one or more single-path communication signals are detectable on the particular road link or on the one or more portions thereof.

According to another embodiment, an apparatus comprises at least one processor, and at least one memory including computer program code for one or more computer programs, the at least one memory and the computer program code configured to, with the at least one processor, cause, at least in part, the apparatus to receive location data of one or more access points that are located substantially nearby a particular road link. The apparatus is also caused to estimate, based on map data, line-of-sight information by projecting propagation of one or more single-path communication signals from the one or more access points to at least one or more portions of the particular road link. The apparatus is further caused to generate a road-link map attribute indicating that one or more single-path communication signals are detectable on the one or more portions. The apparatus is further caused to provide, based at least on the road-link map attribute, coverage information indicating that one or more single-path communication signals are detectable on the one or more portions.

According to another embodiment, a non-transitory computer-readable storage medium carries one or more sequences of one or more instructions which, when executed by one or more processors, cause, at least in part, an apparatus to receive one or more single-path communication signals detected by one or more sensors of a vehicle traveling on a particular road link. The apparatus is also caused to map, based on map data, one or more locations of the vehicle onto at least one or more portions of the particular road link when detecting the one or more single-path communication signals. The apparatus is further caused to generate a road-link map attribute indicating that one or more single-path communication signals are detectable on the one or more portions. The apparatus is further caused to provide the road-link map attribute as an output.

According to another embodiment, an apparatus comprises means for receiving location data of one or more access points that are located substantially nearby a particular road link. The apparatus also comprises means for estimating, based on map data, line-of-sight information by projecting propagation of one or more single-path communication signals from the one or more access points to at least one or more portions of the particular road link. The apparatus further comprises means for generating a road-link map attribute indicating that one or more single-path communication signals are detectable on the one or more portions. The apparatus further comprises means for providing, based at least on the road-link map attribute, coverage information indicating that one or more single-path communication signals are detectable on the one or more portions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of building single-path communication signal map data for road links, according to example embodiment(s);

FIG. 2A is a diagram illustrating road-link map attribute(s) determined at vehicle(s), according to example embodiment(s);

FIG. 11 is a diagram of a mobile terminal (e.g., handset or vehicle or part thereof) that can be used to implement example embodiment(s).

DESCRIPTION OF SOME EMBODIMENTS

Figure 2B:
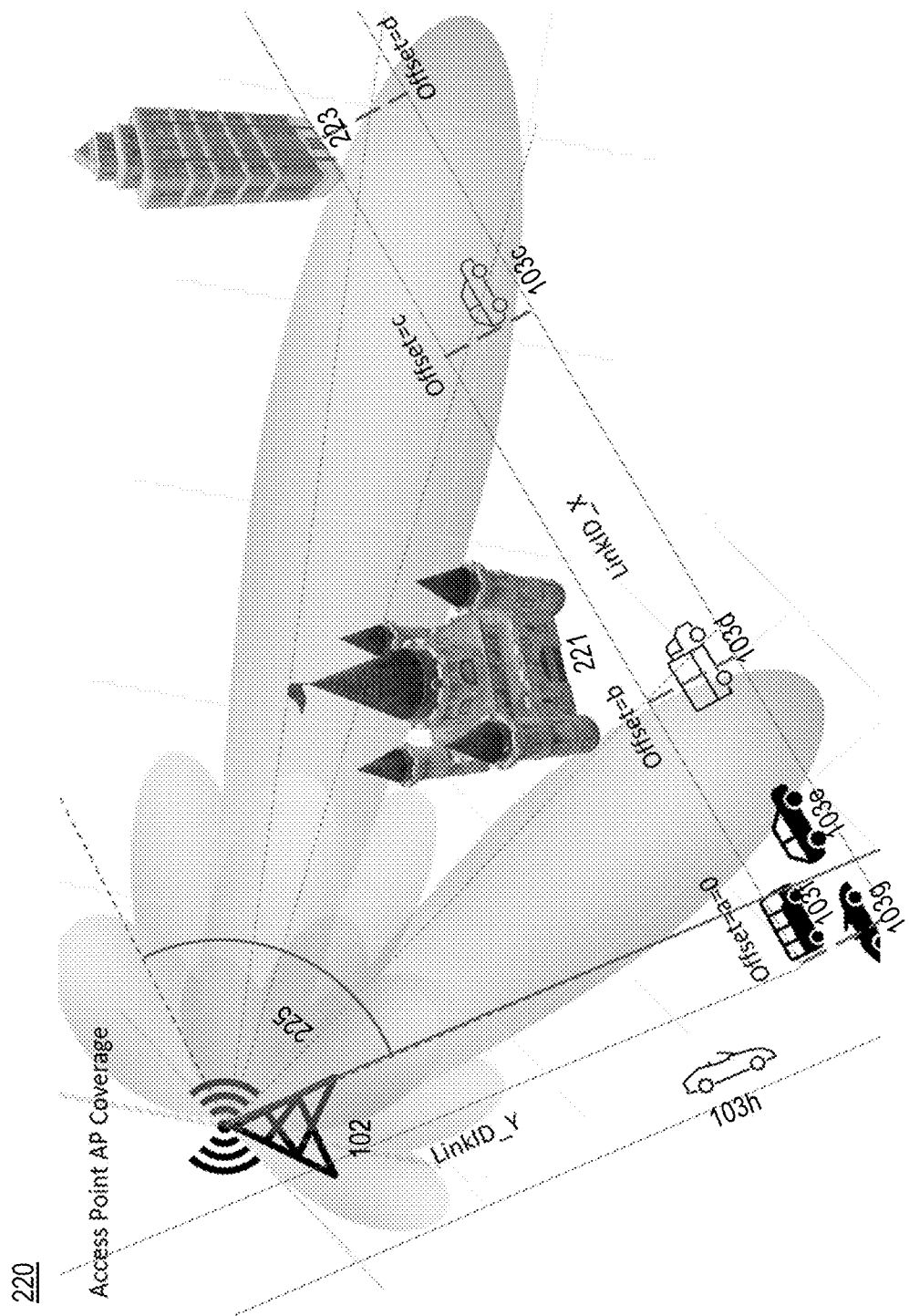
FIG. 2B is a diagram illustrating a line-of-sight obstruction analysis, according to example embodiment(s)

Examples of a method, apparatus, and computer program for building single-path communication signal map data for road links are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system 100 capable of building single-path communication signal map data for road links (e.g., including a road link 101), according to example embodiment(s). By way of example, the road link 101 is covered by a 5G access point 102 (e.g., a 5G cell unit). 5G, as a high speed improvement over 4G, utilizes either the same 600-700 MHz spectrum as 4G (low-band), 2.5-3.7 GHz (mid-band, between 2.4 and 5 GHz Wi-Fi), and 25-39 GHz millimeter wave (high-band). Low and mid band 5G signals have dispersion characteristics that still permit communication when multipath signals are received (e.g., reflected or scattered signals) and can reach up to 900 Mbit/s. On the other hand, high-band 5G requires a more or less direct signal path to achieve Gigabit speeds, as signals in this frequency range do not penetrate objects well and decay quickly when reflected. High-band 5G relies on shorter millimeter wavelengths that travel only short distances, thus require small cell facilities be placed closer together to complement large cell towers to provide coverage. Small cells are frequently attached to utility poles, light poles, or buildings, and work collectively to create radio access networks ("RAN"). The cells have a much shorter transmission range than traditional cell towers (typically 500 to 1,000 ft). The antennas within each 5G access point are highly directional and can use beamforming to direct communication signals to very specific areas around the cell site.

As mentioned above, the static 5G coverage maps are not readily accessible for applications such as vehicle navigation. In addition, the static 5G coverage maps are provided separately by different 5G network service providers (i.e., not consolidated across different providers). Moreover, no actual 5G coverage map data as experienced by vehicles when travelling on roads is available, since the static 5G coverage maps show a theoretical coverage from a 5G cell site. Such theoretical coverage fails to consider many obstructions (e.g., buildings, signs, trees, etc. in cities) between a 5G access point and a receiving device (e.g., a 5G-enabled device). Also, there are dynamic factors that affect the 5G coverage, such as mobile/temporary obstructions (e.g., big trucks, tree-trimming trucks, etc.), malfunctioning 5G access points (e.g., due to failing components, weather, etc.), etc. and should be considered for vehicle navigation, autonomous driving, etc.

To address these problems, the system 100 of FIG. 1 introduces a capability to build single-path communication signal map data for road links, such as by crowd-sourcing 5G road-link map attribute data from vehicles and/or a line-of-sight obstruction analysis, etc. In one embodiment, the system 100 can generate a road-link map attribute indicating that one or more single-path communication signals are detectable on a particular road link or on the one or more portions thereof. As used herein, the term "single-path communication signal" refers to signals that are directly transmitted between a transmitter and a receiver without obstruction, such as mmWave (30-300 GHz), high-band 5G (24-40 GHz), and future generation protocols (e.g., of laser light signals, visible light signals, etc.) that are directly transmitted between a transmitter and a receiver without obstruction. Such obstruction can attenuate the signals to below a predetermine threshold. By way of example, Optical Wireless Communication standards such as "Li-Fi" cannot penetrate walls or other opaque barriers and requires line-of-sight to connect devices, for example, by using light emitting diodes (LEDs) to transmit data at very high speeds (up to 100 Gbps) to a photovoltaic collector. As another example, single path communication via Free-Space Optical Communication (FSO) may also require a line-of-sight to connect devices using Laser transceivers. Although various embodiments are described with respect to 5G, it is contemplated that the approach described herein may be used with other single-path communication signals.

In one embodiment, the system 100 can receive location data and 5G signals from one or more 5G-enabled vehicles 103a-103n (also collectively referred to as vehicles 103) (e.g., standard vehicles, autonomous vehicles, heavily assisted driving (HAD) vehicles, semi-autonomous vehicles, etc.) traversing on a road link (e.g., the road link 101), thereby determine the actual 5G signal availability on the road link. For instance, the vehicles 103 can be 5G-enabled via a 5G communication module that is a built-in or stand-alone unit.

In one embodiment, the vehicles 103 include one or more vehicle sensors 105a-105n (also collectively referred to as vehicle sensors 105) (e.g., 5G antenna, location sensors, etc.) and have connectivity to a mapping platform 107 via a communication network 109. In one embodiment, the system 100 can process sensor data from one or more vehicles 103 to determine where 5G signal(s) are detectible on the road link as road-link map attribute(s). For instance, the vehicle sensors 105 include the antenna-equipped 5G communication module that picks up mmWave signals, such that the road-link map attribute can indicate 5G signal(s) being detectible from a link node of the road link and for a distance (e.g., offset) from the link node along the road link. As another instance, the vehicle sensors 105 include location sensor(s) data for determining vehicle locations, such as GNSS receivers that can be augmented with inertial measurement units (IMUs), LiDAR/computer vision localization, etc.

FIG. 2A is a diagram 200 illustrating road-link map attribute(s) determined at vehicle(s), according to example embodiment(s). In FIG. 2A, each of the 5G-enabled vehicles 103a, 103b travelling on a road link 201 has a 5G communication interface/module for detecting 5G signal(s), e.g., 5G downlink signal(s) 203 transmitted by a 5G access point 102.

Drive testing is commonly deployed by mapping service providers using vehicles installed with highly specialized testing measurement equipment to measure and assess the coverage, capacity and quality of service (QoS) of a mobile radio network. On the other hand, the system 100 can use regular vehicle(s) (e.g., vehicles 103a, 103b) with standard 5G communication interfaces/modules to measure and assess the coverage, capacity and quality of service (QoS) of a 5G access point (e.g., the 5G access point 102).

The 5G access point 102 can be a small cell unit (e.g., a roadside unit, RSU) or a large standalone cell tower. These access points can quickly adjust power usages based on current loads. For instance, when a radio is not in use, the 5G access point 102 will drop down into a lower power state in a few milliseconds, and then re-adjust quickly when more power is needed to support receiving devices (e.g., vehicles 103, IoT objects, etc.).

The access points 102 can be owned and/or operated by private and/or public entities for free or fees. For example, enterprises, local communities, individuals, etc. can own and/or operate their private access points that provide 5G coverage on one or more road links. As other examples, telecommunication service providers, government/municipality agencies, etc. can own and/or operate public access points that provide 5G coverage on road links. For instance, a highway transportation agency can install public access points on its transportation/road infrastructure (e.g., on light poles, traffic signs, etc.).

In one embodiment, the vehicles 103a, 103b are equipped with 5G communication modules with antennas can detect the 5G downlink signal(s) 203 when travelling on the road link 102. For instance, such 5G communication module on the vehicles can report if a millimeter wave signal (25-39 GHz) is being received beyond a threshold signal strength. The threshold indicates that a single-path data transmission is possible if the signal strength is higher than the threshold.

In one embodiment, a 5G communication module for vehicles can combine a communication chip, memory, a RF (radio frequency) circuit, etc. in one unit that enables transmission of 5G communication signals between a vehicle and a 5G cell unit. Such 5G communication module can be built-in or mounted on a vehicle. There are a few commercial models of 5G communication modules, including some chips built-in new vehicles, some modules smaller than a credit card to replace a LTE module in the same spot without changing the vehicle system design, etc.

In addition, the vehicles 103a, 103b can determine their own locations (e.g., from their own location sensors, such as GPS receivers) when detecting the 5G downlink signal(s) 203 on the road link 201, then map their own locations to locations on the road link 201 based on map data, to generate road-link map attributes. Each road link in a road network can be assigned with a unique identifier (e.g., a road link ID) in a map database (e.g., a geographic database 121) for use in reporting or transmitting map data, navigation data, traffic data, the 5G signal data collected by the vehicles 103, etc.

For instance, the map data can be downloaded (e.g., from a map database) and/or stored in, for example, a navigation device of the vehicles 103a, 103b. Using map-matching techniques, the vehicles 103a, 103b can identify the road link they currently travel on, and determine a current offset (e.g., a position along the road link in meters) where the 5G downlink signal(s) 203 is detected. Depending on the resolution or definition of the map data and the vehicle location sensor data, the offset can be as precise as at the lane-level and/or centimeter-level.

For instance, when travelling along the road link 201, the vehicle 103a can detect the 5G downlink signal(s) 203 between a portion between offset=a1 and offset=b1 as well as another portion between offset=c1 and offset=d1, and the offsets can be measured from a link note of the road link 201 (e.g., Node 314766, such as an road junction). In this case, the vehicle 103a can generate a road-link map attribute including a road link ID (e.g., LinkID_X) and offsets. The offsets can be recorded as an array (e.g., (a1,b1);(c1,d1)), enumeration, etc. Other vehicles (e.g., the vehicle 103b) can act similarly to generate road-link map attribute(s) based on the communication signals they detect.

Such road-link map attribute (e.g., including LinkID_X and (a1,b1);(c1,d1)) is light-weighted (e.g., less than a kilobyte) and does not require as much resources to store, transmit, and map-match when compared to a communication signal availability map based on polygons for geofences, area definitions, etc. By piggybacking on road links and notes of a pre-defined map database, the road-link map attribute has a compact data size compared with a geographic information system (GIS) polygon object that stores its geographic representation as a series of geographic coordinate sets enclosing a wireless network, e.g., a 5G network, coverage area. The compact data size of the road-link map attribute takes less memory space to store and less communication bandwidth to transmit. In addition, since the road-link map attribute is tired to a road link, a vehicle can directly map its currently location with respective to a current road link and determine whether its location is within a 5G detectible portion of the road link, thus avoiding map-matching the current vehicle location to a 5G-covered polygon, or using even more complex functions to match the 5G-covered polygon to road geometry which requires much more computation resources and processing time.

As mentioned, the vehicles 103 can collect sensor data (including actual 5G signals) on a road link and/or in a road network. In particular, each vehicle 103 is configured to report sensor data as a road-link map attribute (e.g., including a road link ID, offsets, etc.), which are individual data records collected at a point in time travelling on a road link that detects 5G signal data for that point in time. For instance, the 5G signals can be collected by the antenna-equipped 5G communication module. In one embodiment, the road link ID can be permanent. In another embodiment, the road link ID is valid for a certain period of time, for example, to control data access (e.g., subject to prescription) and security (e.g., subject to access levels). In one embodiment, the vehicles 103a, 103b can submit a road-link map attribute as a minimal reporting data package containing the following information to the system 100 as in Table 1.

TABLE 1

Link ID: LinkID_X (possibly also with map version)
5G communication provider: e.g. Telekom
5G Mil. Wave received at offsets: (a1, b1); (c1, d1)

The minimal reporting data package is provided by way of illustration and not limitation. In addition to or in place of the above-described offsets, the system 100 can use other forms of location indications such as midpoint, z-level, geofences, standards and formats for the encoding/transmission/decoding of location data (e.g., OpenLR), etc. to identify 5G-covered portions on a road-link in a map database. The system 100 can also use different arrangements/hierarchies to report communication providers, offsets, etc. in the road-link map attribute.

By aggregating the road-link map attributes from multiple vehicles 103, the system 100 can provide a new map attribute with detailed and/or verified data of available 5G high-band access for every report link in a link attribute representation as in Table 2.

TABLE 2

- LinkID_X
    ○ Midpoint
    ○ Speed Limit
    ○ ... (all other available different link attributes)
    ○ 5G Provider: e.g. Telekom
        ■ 5G High Speed availability: [a,b];[c,d]
    ○ 5G Provider: e.g. AT&T
        ■ 5G High Speed availability: [a,b];[y,z]

In other embodiments, a road-link map attribute can additionally include one or more elements such as: (1) communication signal provider(s) and/or ID, (2) signal strength, (3) estimated distance from an access point, (4) azimuth angle from the access point (or angle relative to the road link), (5) elevation angle from the access point, (6) time, etc. The list of elements is provided by way of illustration and not limitation. Accordingly, it is contemplated that any combination of these elements or other elements may be included in a road-link map attribute.

For instance, the 5G communication module of the vehicles 103a, 103b can also measure/indicate an estimated range/distance to the access point 102 and estimated angle(s) based on signal strength(s) detected by antenna elements of the 5G communication module. The estimated angles can include azimuth angle and/or elevation angle from the access point.

In one embodiment, the antenna elements of the 5G communication module of the vehicles 103 are multiple input, multiple output (MIMO) antenna elements with main lobe characteristics. In MIMO, each spatial stream is transmitted from a different radio/antenna chain in the same frequency channel from a transmitter (e.g., the access point 102). A receiver on a vehicle 103 can receive each stream on each of its identical radio/antenna chains, and reconstruct the original streams from the MIMO transmitter based on the phase offsets of its own antenna.

The system 100 can provide a more detailed road-link map attribute, for example, including signal strength and angle of incidence of the signal, which can further pinpoint the position of the access point 102 as in Table 3.

TABLE 3

- Link ID: LinkID_X (with map version)
- 5G communication provider: e.g. Telekom
- 5G Mil. Wave received at offsets: (a1,b1)
    ○ Signal strength
    ○ Estimated distance
    ○ Azimuth angle
    ○ Elevation angle
- 5G Mil. Wave received at offsets: (c1,d1)
    ○ ...
■

In one embodiment, the vehicles 103a, 103b can transmit the road-link map attributes as or within 5G uplink signal(s) 205 to the 5G access point 102, which then can relay the 5G uplink signal(s) 205 to a backend/server 207 (or a cloud) for further processing (e.g., aggregation into map data, map data layer, etc.). For instance, the backend/server 207 can reside in a 4G or 5G core network, depending on 5G service providers. Some 5G service providers pair the 5G cell sites with existing LTE (4G) infrastructure (i.e., a non-standalone mode), some 5G service providers pair the 5G cell sites with the 5G core network (i.e., a standalone mode).

With the detailed road-link 5G coverage information, a vehicle later travelling on the road link can use its 5G communication module to establish a 5G connection (e.g., via driving beamforming algorithm(s)) with the access point 102 in a quicker fashion. For example, the 5G communication module of the later vehicle can drive its antenna using beamforming algorithm(s) to target at the angle(s) to the access point for listening for 5G signals. When a mounted height of the access point 102 is unknown, an elevation angle to the access point can be used to target the access point 102 in the vertical direction.

Once determining its location is within a 5G detectible portion of the road link, a vehicle can activate it 5G communication module to establish a 5G connection for different applications, such as navigation, media streaming, etc. Given that the 5G signals are received in a direct path (i.e., a single-path) from a 5G access point, the detection of 5G signals is much clearer and less subject to noise, contrary to other frequencies that are subject to multipath effects making the detection and definition of signals coverage fuzzier.

The road-link map attributes can be reported from the vehicles 103 in real-time, in batches, continuously, or at any other frequency requested by the system 100 over, for instance, the communication network 109 for processing by the mapping platform 107. The road-link map attributes also can be stored in the geographic database 121. In one embodiment, the system 100 (e.g., via the mapping platform 107) can aggerate road-link map attributes from the vehicles and the other sources as discussed with respect to the various embodiments described so that the road-link map attributes can be aggregated for the road links through the road network.

Alternatively or currently, the vehicles 103a, 103b can transmit the road-link map attributes via a different 5G access point and/or a different network then to the backend/server 207 (or the cloud). For example, the vehicle 103a can travel into a section of the road link 201 not covered by the 5G access point 102, and transmit the road-link map attribute (1) to another vehicle currently covered by the 5G access point 102 (e.g., via V2V communication to the vehicle 103b), (2) to a different 5G access point, (3) to another 5G-enabled device (e.g., via V2X communication to a traffic sign), (4) to a different network (e.g., a 4G LTE network), etc. The road-link map attributes are lightweighted (e.g., less than a kilobyte) to be transmitted over almost any available wireless data links such that (4) is most likely based on the availability.

The backend/server 207 or the cloud can aggregate, update, and/or verify road-link map attributes from different vehicles (e.g., vehicles 103a, 103b) currently and/or previously travelling on the road link 201, to provide an aggregated link attribute indicating which road link (e.g., the road link 201) and/or which portion(s) of the road link wherein 5G signals (e.g., the 5G downlink signal(s) 203) is detectable. By analogy, the backend/server 207 or the cloud can aggregate road-link map attributes of road links in a road network and/or an geographic area of interest as road-link based 5G coverage map data (e.g., as a 5G signal map layer) for different usages, such as map marking/updates, route planning, data availability visualizations, etc. Such road-link based 5G coverage map data can enable vehicles 103 to determine where to listen for 5G signals, thus efficiently and effectively establishing 5G connections while avoiding constantly listening for 5G signals (which unnecessarily wastes communication resources and battery power).

During the above aggregation, the system 100 can filter/clean road-link map attributes crowdsourced from different vehicles to improve accuracy, such as identifying and excluding noises, outliers, errors, etc. For instance, the system 100 can exclude outliers (e.g., false positives/negatives caused by malfunctioning vehicle sensors) among the crowdsourced road-link map attributes from different vehicles.

The system 100 can provide the 5G coverage information for a given road link, publish the 5G coverage information for all links in one area in a map database, etc. A client may submit a query identifying a road link, and receive the offsets with 5G coverage in order to listen for 5G signals when travelling on the road link.

Once the 5G connection is established, the vehicles 103 can use high bandwidth capacity and fast speed of the 5G connections to support a range of use cases, such as autonomous driving, 5G gaming/streaming, virtual reality, artificial intelligence (AI), and IoT applications, etc. In addition, the system 100 can calculate routes including road links with 5G signal coverage, to schedule data transmissions to occur when vehicles travelling on such road links (e.g., for movie streaming), etc.

Once the 5G connection is established, the 5G access point 102 can use information on angles of arrival (AoA) of the vehicles 103 provided by its antenna (e.g., sector antenna or planar array in both elevation and azimuth planes), to estimate directions of arrival (DoA) of each vehicle's uplink signal. The 5G access point 102 can distinguish different vehicles 103 using proper beamforming and steer its array beam(s) to desired direction(s) which optimize some preferred performance metric of the 5G access point 102 and/or the 5G network.

In another embodiment, the system 100 can generate a road-link map attribute using a line-of-sight obstruction analysis from the perspective of a 5G access point, and determine whether there is a clear path to a portion of the road link (e.g., using 5G signal projection). As previously mentioned, an unobstructed signal path (e.g., a single-path) between the access point 102 and the vehicles 103 is required to establish a high-band 5G connection, since 25-39 GHz (millimeter wave) signals decay significantly when reflected. This requirement translates to a line-of-sight between a receiver and an access point. As such, road links with a free view to the access point 102 will be accessible for high-band 5G signals. By obtaining a dataset comprising locations of the access points, the system 100 can calculate a 5G signal coverage on a road link and/or portion(s) of the road link within a radius of the access point 102. The system 100 can consider any three-dimensional (3D) object represented in a map database as located between the access point 102 and the road link as an obstruction of 5G signal coverage.

FIG. 2B is a diagram 220 illustrating a line-of-sight obstruction analysis, according to example embodiment(s). FIG. 2B shows the 5G access point 102 can cover a portion between Offset=a and Offset=b and another portion between Offset=c and Offset=d of a road link (e.g., LinkID_X), due to obstructions by a building 221 and a building 223. The system 100 can calculate the obstructions based on three-dimensional (3D) models and/or two-dimensional (2D) object footprints of the buildings 221, 223 between the 5G access point 102 and the road link. For instance, the system 100 can simulate a 5G signal projection (e.g., triangular projection) from the 5G access point 102 as a vertex that can yield the portion(s) where a line-of-sight exists using 2D object footprints of the buildings 221, 223.

By way of example, the system 100 can retrieve map data (e.g., from the geographic database 121) that contains 3D models and/or 2D footprints of obstructions, such as buildings, constructions, hills, trees, etc., which can interfere with 5G signals. The map data can be generated by survey data, high-resolution aerial images, etc.

Taking a building as an example (e.g., the building 221), the system 100 can use a 2D polygon to represent a footprint of the building, and use a 3D polygon extrusion to represent the 3D surfaces of the building. A height of the building can be determined based on measurements, aerial imaging, declared building heights, a median height of a building for the area, etc. Alternatively, the system 100 can use map data of a 3D model of the building (i.e., a more detailed version of the building retrieved form the geographic database 121) that accounts for shape changes in the z direction. Using a pyramid as a building example, a 2D pyramid footprint plus a height can yield a rectangular block, while a 3D model of the pyramid can account for the pyramid shape. The system 100 can use the 2D and/or 3D data (e.g., from the geographic database 121) to determine potential communication signal obstructions, while the 3D data can provide more detailed communication signal coverage information.

In another embodiment, the system 100 can refine the 5G signal projection by applying one or more predetermined (e.g., default) beamforming algorithms to estimate 5G signal coverages and/or strengths on portion(s) of the road link. Beamforming can control a beam pattern radiation in a plane, elevation (vertical), horizontal (azimuth), etc., such as controlling the direction and shape of a wave-front by appropriately weighting the magnitude and phase of individual antenna signals in an array of multiple antennas. In contrast to 2D beamforming, 3D beamforming adapts the radiation beam pattern in both elevation and azimuth planes to provide more degrees of freedom in supporting 5G signal projection.

By way of example, the system 100 can apply a 3D beamforming algorithm to simulate a 3D beamformed communication signal 225 in FIG. 2B, and estimate that a vehicle 103c is within a 5G-covered portion between Offset=c and Offset=d, a vehicle 103d is obstructed by the building 221, a vehicle 103e is heading into 5G-covered portion between Offset=a and Offset=b, while vehicles 103f-103h are outside of the 5G coverage of the 5G access point 102. In this case, the road-link map attribute can include offsets (e.g., [a,b];[c,d]). Similar to the embodiments described in conjunction with FIG. 2A, a new road-link map attribute generated according to the line-of-sight analysis (e.g., FIG. 2B) can be expressed as in Table 2, and extended with additional elements as in Table 3.

In another embodiment, the system 100 can further refine the 5G signal projection by considering the actual antenna design and installation of the access point 102. Such information can be retrieved from websites and/or databases of 5G service providers. 5G Antennas can be classified based on input output ports (e.g., single input single output (SISO), multiple input, multiple output (MIMO), etc.), antenna types (e.g., monopole, dipole, magneto-electric (ME) dipole, loop, fractal, inverted F antenna (IFA), planar inverted F antenna (PIFA), etc.), product models (supporting different frequency rages, isolations, gains, efficiencies, etc.), etc. By way of example, 5G massive multiple input, multiple output (mMIMO) antennas become more popular since they have large numbers of antenna elements and/or connections to send and receive more data with many participating entities (e.g., vehicles, user devices, etc.) simultaneously and with high throughput. For instance, the system 100 can retrieve antenna specification and deployment data from a 5G communication service provider of the access point 102 including: a site ID, azimuth, full beamwidth, radius, tilt angle, frequency or frequency range, etc., then covert the antenna specification and deployment data into 5G signal projection, thereby determining road-link 5G coverage data (e.g., the road-link map attribute) based on the 5G signal projection as discussed.

Figure 2C:
FIG. 2C is a diagram illustrating a temporary obstruction scenario, according to example embodiment(s)

As mentioned, a vehicle can download the road-link 5G coverage information, and determine where to listen for 5G signals when travelling. However, the 5G signals can sometimes be blocked by mobile/temporary obstructions (e.g., big trucks, tree-trimming trucks, etc.) on the road links. FIG. 2C is a diagram 240 illustrating a temporary obstruction scenario, according to example embodiment(s). In one embodiment, the system 100 can use the crowd-sourcing method depicted in FIG. 2A, to collect temporary obstruction data from vehicles 103. After determining the presence of a mobile/temporary obstruction on one road link, the system 100 can predict subsequent locations of the mobile/temporary obstruction based at least on its trajectory data (e.g., probe data), and apply the line-of-sight analysis (e.g., the 5G signal projection) on the mobile/temporary obstruction to predict 5G-covered portions of subsequent road links to be traveled by the mobile/temporary obstruction.

In FIG. 2C, a vehicle 103j is obstructed by a vehicle 103i (e.g. a truck trailer) from receiving 5G signal(s) transmitted by a 5G access point 102. In this scenario, the vehicle 103j can detect such mobile/temporary obstruction based on the link-based 5G coverage information (including the road-link map attribute(s) as discussed). For instance, where the vehicle 103j expects yet does not detect 5G signal(s) 241 on a road link 243 based on the link-based 5G coverage information, the vehicle 103j can use one or more on-board sensors 105 (e.g., cameras, LiDAR, RADAR, Ultrasonic, etc.) to detect characteristics (e.g., travel direction, travel lane, dimensions, speed, license plate, etc.) of the mobile/temporary obstruction (e.g., the vehicle 103i), and then notify the system 100 of the location and the characteristics of such temporary obstruction obstructing 5G signal(s) indicated in the link-based 5G coverage information. Such notification can be transmitted to the system 100 via (1) another vehicle travelling on the road link covered by the 5G access point 102 (e.g., using V2V communication to the vehicle 103i), (2) a different 5G access point nearby the road link or the next road link, (3) another 5G-enabled device (e.g., using V2X communication to a traffic sign), (4) a different network (e.g., a 4G LTE network), etc.

As a result, the system 100 can use the location and the characteristics of the mobile/temporary obstruction to generate/forecast road-link based 5G coverage map data indicating road-link based 5G coverage information that factors in the temporary obstruction(s). In addition, the system 100 can aggerate location and characteristic data of mobile/temporary obstructions collected by vehicles per road link, and publish the aggregated information (factored in temporary obstruction(s)), for example, a 5G-coverage map layer. Data coming from the temporary obstruction(s) (e.g., truck (s) or similarly tall vehicles) as discussed can facilitate generating such 5G-coverage map layer.

Alternatively or concurrently, the system 100 can translate the aggerated information into an accuracy consideration to adjust the road-link based 5G coverage map data. For instance, the system 100 can calculate a presence probability of mobile/temporary obstruction(s) on a particular road link as a time function, and then reduce a confidence value of the road-link based 5G coverage information accordingly. By way of example, a major interstate highway has peak traffic for container trucks during 9:00-11:00 am and 5:00-7:00 pm during weekdays. The system 100 can reduce a confidence value of 5G coverage map information for road-links of such highway during these peak traffic hours accordingly.

In another embodiment, the system 100 can also collect 5G signal data from one or more user equipment (UE) 111a-111n (also collectively referenced to herein as UEs 111) associated with the vehicles 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application). In another embodiment, the system 100 may also collect 5G signal data from one or more other sources such as the transportation/road infrastructure implemented by government/municipality agencies, local or community agencies (e.g., police departments), and/or third-party official/semi-official sources (e.g., the services platform 115, one or more services 117a-117n, one or more content providers 119a-119m, etc.). In one instance, the 5G signal data collected by the vehicle sensors 105, the UEs 111, one or more other sources, or a combination thereof may be stored in the geographic database 121 or a combination thereof.

Figure 3:
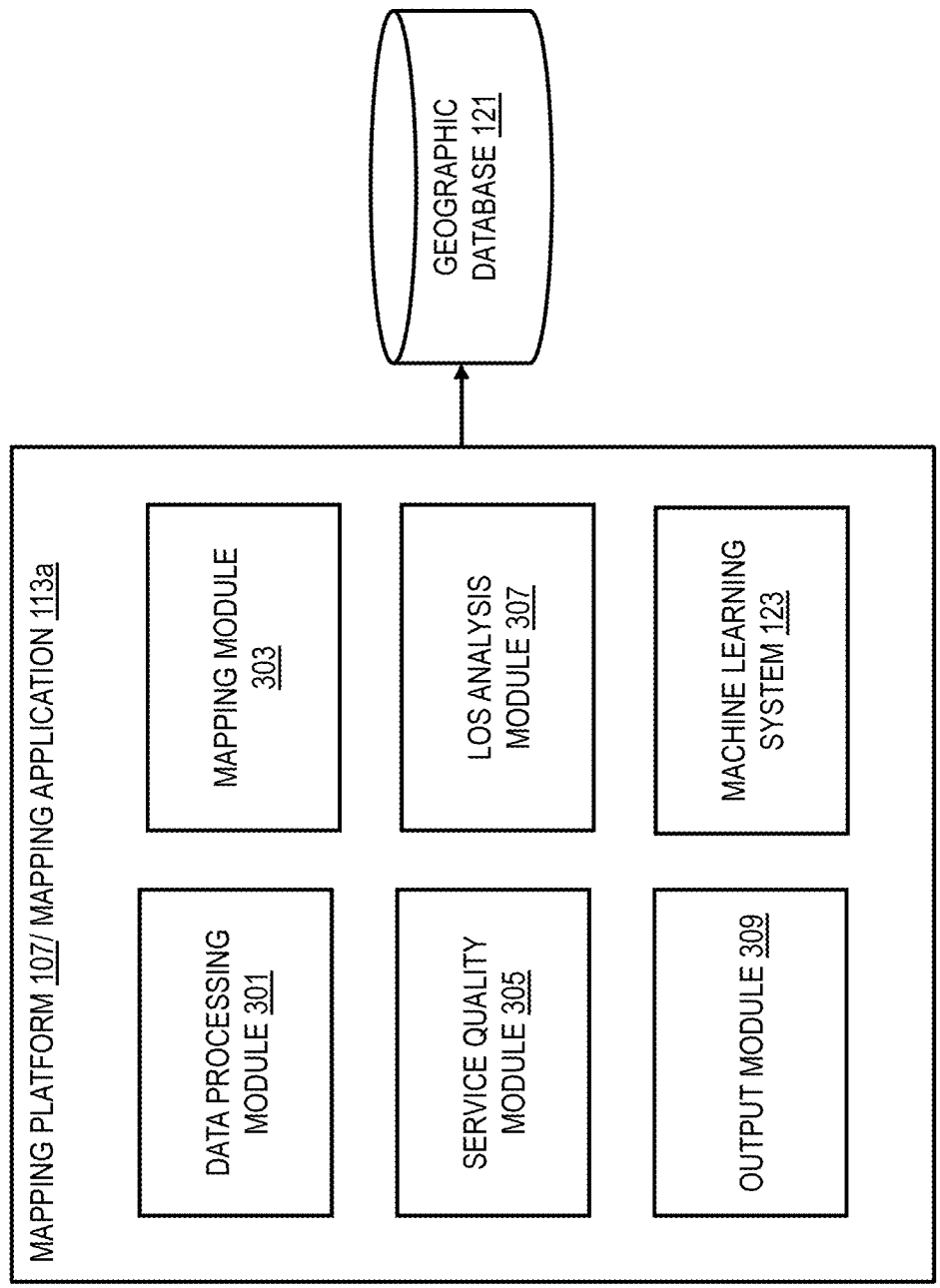
FIG. 3 is a diagram of the components of a mapping platform and/or a mapping application configured to build single-path communication signal map data for road links, according to example embodiment(s)

FIG. 3 is a diagram of the components of a mapping platform and/or a mapping application configured to build single-path communication signal map data for road links, according to example embodiment(s). By way of example, the mapping platform 107 and/or a mapping application 113a includes one or more components for building single-path communication signal map data for road links, according to the various embodiments described herein. It is contemplated that the functions of these components may be combined or performed by other components of equivalent functionality. In one embodiment, the mapping platform 107 includes a data processing module 301, a mapping module 303, a service quality module 305, a line-of-sight (LOS) analysis module 307, an output module 309, and a machine learning system 123, and has connectivity to the geographic database 121. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 301-309 may be implemented as a cloud-based service, local service, native application, or combination thereof. The functions of the mapping platform 107, the machine learning system 123, and/or the modules 301-309 are discussed with respect to FIGS. 4-7.

Figure 4:
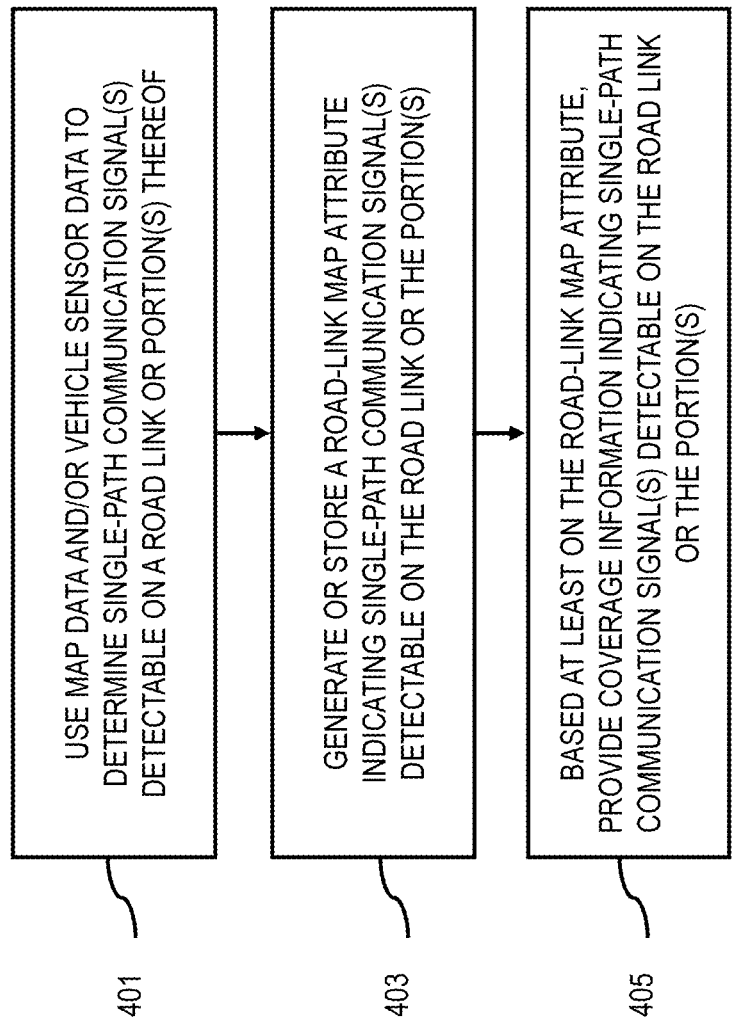
FIG. 4 is a flowchart of a process for building single-path communication signal map data for road links, according to example embodiment(s)
Figure 10:
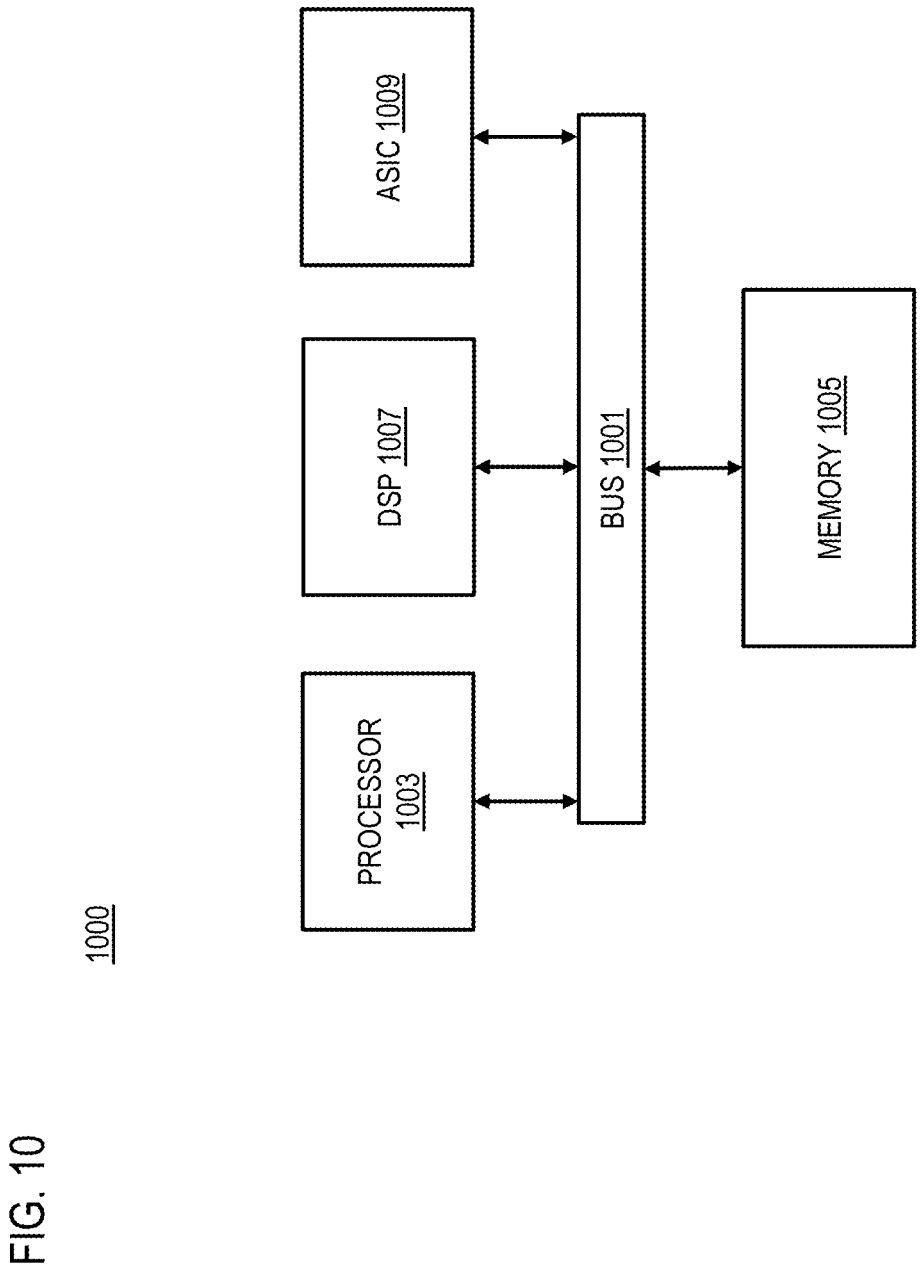
FIG. 10 is a diagram of a chip set that can be used to implement example embodiment(s)

FIG. 4 is a flowchart of a process for building single-path communication signal map data for road links, according to example embodiment(s). In various embodiments, the mapping platform 107, the mapping application 113a, the machine learning system 123, and/or any of the modules 301-309 may perform one or more portions of the process 400 and may be implemented in, for instance, a chip set including a processor and a memory as shown in FIG. 10. As such, the mapping platform 107, the machine learning system 123, and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, the data processing module 301 can retrieve map data (e.g., from one or more mapping services, map databases, etc.) and/or vehicle sensor data for processing. For instance, the vehicle sensor data can include 5G signal data detected by the vehicle 103 when travelling on a particular road link. In one embodiment, each vehicle 103 is configured to report 5G signal data as road-link map attributes, which are individual data records collected at a point in time when the vehicle 103 is travelling on the rod link.

In one embodiment, for example, in step 401, the data processing module 301 can work in conjunction with the mapping module 303 and/or the LOS analysis module 307 to use one or more of the map data or the vehicle sensor data to make a determination that one or more single-path communication signals (e.g., the 5G downlink signal(s) 203 in FIG. 2A) are detectable on a particular road link (e.g., the road link 201) or on one or more portions (e.g., the portion between offset=a1 and offset=b1 as well as the other portion between offset=c1 and offset=d1 in FIG. 2A) thereof.

In this scenario, a given single-path communication signal has line-of-sight to the particular road link (e.g., the road link 201) or at least to one of the one or more portions of the particular road link. By way of example, the one or more single-path communication signals include one or more millimeter wave signals, high-band 5G signals, laser light signals, or visible light signals.

In one embodiment, in step 403, the mapping module 303 and/or the LOS analysis module 307 can generate or store, based on the determination, a road-link map attribute (e.g., (a1,b1); (c1,d1) in Table 1) indicating that one or more single-path communication signals (e.g., the 5G downlink signal(s) 203) are detectable on the particular road link (e.g., the road link 201) or on the one or more portions thereof.

In one embodiment, in step 405, the output module 309 can provide, based at least on the road-link map attribute (e.g., (a1,b1); (c1,d1) in Table 1), coverage information (e.g., including [a,b]; [c,d] in Table 2) indicating that one or more single-path communication signals are detectable on the particular road link (e.g., the road link 201) or on the one or more portions thereof. For instance, the data processing module 301 can receive and store the road-link map attribute (e.g., (a1,b1); (c1,d1) in Table 1) respectively generated at one or more vehicles (e.g., vehicles 103a, 103b), and aggregate the stored road-link map attribute into an aggregated map attribute (e.g., [a,b]; [c,d] in Table 2) for the particular road link (e.g., the road link 201). The providing of the coverage information by the output module 309 is based on the aggregated map attribute (e.g., [a,b]; [c,d] in Table 2).

In one embodiment, the service quality module 305 can receive the vehicle sensor data from one or more vehicles (e.g., via the data processing module 301), and the vehicle sensor data can indicate one or more quality of service measurements of one or more single-path communication signals (e.g., the 5G downlink signal(s) 203, the 5G uplink signal(s) 205, etc. in FIG. 2A) detected at the one or more vehicles. For instance, the existing and/or future 5G communication modules in vehicles can include built-in QoS components to automatically measure and monitor 5G communication signals QoS. For instance, the one or more quality of service measurements include one or more download transmission speeds (e.g., based on the 5G downlink signal(s) 203), one or more upload transmission speeds (e.g., based on the 5G uplink signal(s) 205), one or more delay time periods, one or more ping time periods, one or more jitter measurements, or a combination thereof. The data processing module 301 can then include the one or more quality of service measurements in one or more of the road-link map attribute (e.g., extending Table 1) or the coverage information (e.g., extending Table 2).

By way of example, the quality of service measurements can be calculated by a 5G communication module in the vehicle 103a based on one or more single-path communication signals (e.g., the 5G downlink signal(s) 203 and/or 5G uplink signal(s) 205 in FIG. 2A) transmitted between the vehicle 103a and the access point 102. By way of example, the single-path communication signals can be received by MIMO antenna of the 5G communication module. As mentioned, in MIMO, each spatial stream is transmitted from a different radio/antenna chain in the same frequency channel of a transmitter. Therefore, the MIMO antenna of the 5G communication module in the vehicle 103a can receive each stream on each of its identical radio/antenna chains, and reconstruct the original streams based on the phase offsets of its own antenna. Based on the reconstructed streams, a QoS component of the 5G communication module can determine the quality of service measurements of the 5G downlink signal(s) 203 and/or 5G uplink signal(s) 205 in FIG. 2A.

Referring back to the line-of-sight analysis depicted in FIG. 2B, in one embodiment, the LOS analysis module 307 can determine, based on the map data, one or more access points (e.g., the access point 102 in FIG. 2B) located substantially nearby the particular road link (e.g., LinkID_X). As mentioned, a distance from an access point 102 to one or more road links can depend on the 5G coverage capabilities of the access point 102, which in turn depends on the hardware/software design of the access point 102. For instance, a small cell unit (less powerful) may need to locate closer to a target road link than a large standalone cell tower. Besides distance, position is another installation factor to consider, since a well-situated small cell unit can more effective than a poorly-situated standalone cell tower.

The LOS analysis module 307 can then estimate line-of-sight information by projecting propagation of one or more single-path communication signals (e.g., the 3D beamformed communication signal 225 in FIG. 2B) from the one or more access points (e.g., the access point 102) to at least the one or more portions of the particular road link (e.g., LinkID_X). In this embodiment, the road-link map attribute (e.g., [a,b];[c,d]) can be generated further based on the line-of-sight information. In another embodiment, the LOS analysis module 307 can determine, based on the map data, at least one object (e.g., the buildings 221, 223) located substantially nearby the particular road link (e.g., LinkID_X), and the projecting (e.g., of the 3D beamformed communication signal 225 in FIG. 2B) accounts for presence of the at least one object (e.g., the buildings 221, 223).

In one embodiment, the data processing module 301 can determine the one or more portions (e.g., the 5G-covered portion between Offset=a and Offset=b) of the particular road link as one or more offsets from one or more nodes on the particular road link (e.g., LinkID_X). The road-link map attribute (e.g., [a,b];[c,d]) includes the one or more offsets from the one or more nodes.

In one embodiment, the data processing module 301 can determine, based on one or more single-path communication signals (e.g., the 5G downlink signal(s) 203 and/or 5G uplink signal(s) 205 in FIG. 2A, the 3D beamformed communication signal 225 in FIG. 2B, etc.), one or more signal strengths, one or more distances, one or more angles of incidence, one or more signal providers, or a combination thereof associated with one or more access points (e.g., the access point 102) that transmit the one or more single-path communication signals. The data processing module 301 can then include the one or more signal strengths, the one or more distances, the one or more angles of incidence, the one or more signal providers, or a combination thereof in one or more of the road-link map attributes or the coverage information (e.g., as shown in Table 3). For instance, the one or more angles of incidence can include one or more azimuth angles relative to the particular road link, one or more elevation angles relative to the one or more access points (e.g., the access point 102) located substantially nearby the particular road link (e.g., the road link 201, LinkID_X), or a combination thereof.

Figure 5:
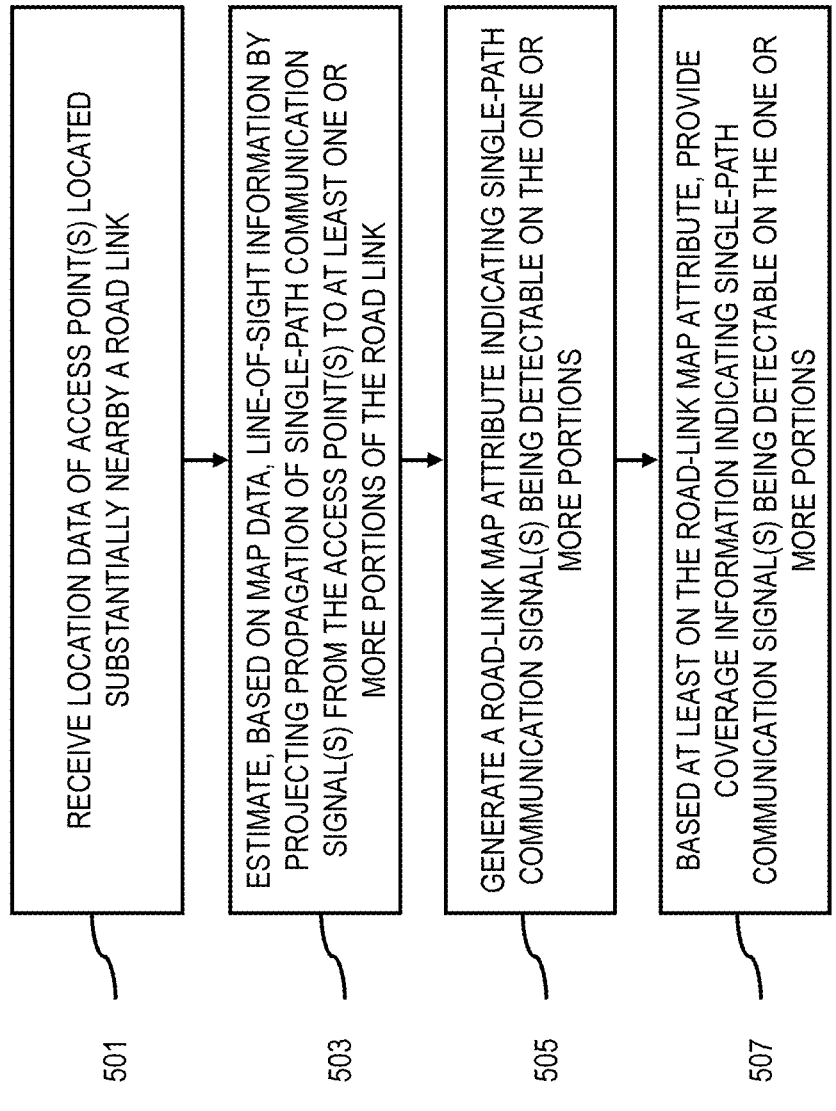
FIG. 5 is a flowchart of a process for building single-path communication signal map data for road links based on a line-of-sight obstruction analysis, according to example embodiment(s)

FIG. 5 is a flowchart of a process for building single-path communication signal map data for road links based on a line-of-sight obstruction analysis, according to example embodiment(s). In various embodiments, the mapping platform 107, the mapping application 113a, the machine learning system 123, and/or any of the modules 301-309 may perform one or more portions of the process 500 and may be implemented in, for instance, a chip set including a processor and a memory as shown in FIG. 10. As such, the mapping platform 107, the machine learning system 123, and/or the modules 301-309 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In one embodiment, in step 501, the data processing module 301 can receive location data of one or more access points that are located substantially nearby a particular road link (e.g., LinkID_X in FIG. 2B). For instance, the location data of one or more access points (e.g., the access point 102 in FIG. 2B) can be retrieved from websites and/or databases of 5G service providers. As mentioned, an installation position and a distance from an access point to one or more road links can depend on the 5G coverage capabilities of the access point, which in turn depends on the hardware/software design of the access point. For instance, a small cell unit (less powerful) may need to locate closer to a target road link than a large standalone cell tower. On the other hand, a well-situated small cell unit can more effective than a poorly-situated standalone cell tower.

In one embodiment, in step 503, the LOS analysis module 307 can estimate, based on map data, line-of-sight information by projecting propagation of one or more single-path communication signals (e.g., the 3D beamformed communication signal 225 in FIG. 2B) from the one or more access points (e.g., the access point 102 in FIG. 2B) to at least one or more portions of the particular road link (e.g., LinkID_X in FIG. 2B). For instance, the map data can be downloaded (from a map database) and/or stored in a cloud.

In one embodiment, in step 505, the LOS analysis module 307 can generate a road-link map attribute (e.g., [a,b];[c,d] in Table 2) indicating that one or more single-path communication signals (e.g., the 3D beamformed communication signal 225 in FIG. 2B) are detectable on the one or more portions (e.g., the portion between offset=a and offset=b as well as the other portion between offset=c and offset=d in FIG. 2B).

In one embodiment, in step 507, the output module 309 can, based at least on the road-link map attribute, provide coverage information (e.g., including [a,b];[c,d] in Table 2)

indicating that one or more single-path communication signals are detectable on the one or more portions.

In another embodiment, the LOS analysis module 307 can determine, based on the map data, at least one object (e.g., the buildings 221, 223 in FIG. 2B) located substantially nearby the particular road link (e.g., LinkID_X in FIG. 2B), and the projecting accounts for presence of the at least one object. Taking the building 221 (e.g., a castle) as an example, the LOS analysis module 307 can use a 2D polygon to represent a footprint of the castle, and/or use a 3D polygon extrusion to represent the 3D surfaces of the castle. A height of the castle can be determined based on measurements, aerial imaging, declared castle heights, a median height of castles in the area, etc. Alternatively, the LOS analysis module 307 can use map data of a 3D model of the castle that accounts for shape changes in the z direction. In this case, a 2D pyramid footprint plus a height of the castle can yield a rectangular block, while a 3D model of the castle can account for the castle shape. The LOS analysis module 307 can use the 2D and/or 3D data (e.g., from the geographic database 121) to determine potential communication signal obstructions, while the 3D data can provide more detailed communication signal coverage information.

In yet another embodiment, the data processing module 301 and the LOS analysis module 307 in connection with the machine learning system 123 can select respective factors such as vehicle models, traffic patterns, road topology, driving behaviors, vehicle sensors, digital map data, 5G propagation factors that affect the performance of 5G millimeter wave radio channels, operating frequencies of the radio channels, vehicle mobility, surrounding obstructions/objects (i.e., fixed or moving), etc., to determine 5G-covered portions of a road link under different scenarios/context in different regions (e.g., towns, city, suburbs, mountains, countries, etc.). In one embodiment, the machine learning system 123 can select or assign respective weights, correlations, relationships, etc. among the factors, to determine optimal distance thresholds/widths/length for the respective factors under scenarios/context. In one instance, the machine learning system 123 can continuously provide and/or update a 5G-covered road-link machine learning model (e.g., a support vector machine (SVM), neural network, decision tree, etc.) during training using, for instance, supervised deep convolution networks or equivalents. In other words, the machine learning system 123 can train the machine learning model for destemming 5G-covered road-links and or portions thereof using the respective weights of the factors to efficiently determine 5G-covered portions of a road link under different scenarios in different regions.

In another embodiment, the machine learning system 123 of the mapping platform 107 includes a neural network or other machine learning system to compare (e.g., iteratively) 5G-covered portion features and/or to enhance precision of 5G-covered portions on reported road links. In one embodiment, the neural network of the machine learning system 123 is a traditional convolutional neural network which consists of multiple layers of collections of one or more neurons (which are configured to process a portion of an input data). In one embodiment, the machine learning system 123 also has connectivity or access over the communication network 109 to the geographic database 123 that can each store 5G coverage data (e.g., survey data as ground truth data).

In one embodiment, the machine learning system 123 can improve the road-link 5G coverage information based on, for example, vehicle behavior and/or user feedback data. In one embodiment, the machine learning system 123 can improve the 5G-covered road-link machine learning model using vehicle behavior and/or feedback data (e.g., surveyed as in FIG. 7C) as training data. For example, the machine learning system 123 can analyze correctly identified 5G-covered road-link/portion data, missed 5G-covered road-link/portion data, etc. to determine the performance of the machine learning model for determining 5G-covered road-links and/or portions thereof.

In one embodiment, the data processing module 301 can determine the one or more portions of the particular road link (e.g., LinkID_X in FIG. 2B) as one or more offsets from one or more nodes on the particular road link, and the road-link map attribute (e.g., [a,b];[c,d] in Table 2) can include the one or more offsets from the one or more nodes.

In one embodiment, the data processing module 301 can determine, based on one or more single-path communication signals (e.g., the 3D beamformed communication signal 225 in FIG. 2B), one or more signal providers, one or more signal strengths, one or more distances, one or more angles of incidence, or a combination thereof associated with the one or more access points (e.g., the access point 102 in FIG. 2B). The data processing module 301 can then include one or more signal providers, the one or more signal strengths, the one or more distances, the one or more angles of incidence, the signal provider data, or a combination thereof in one or more of the road-link map attribute or the coverage information (e.g., as shown in Table 3).

Figure 6:
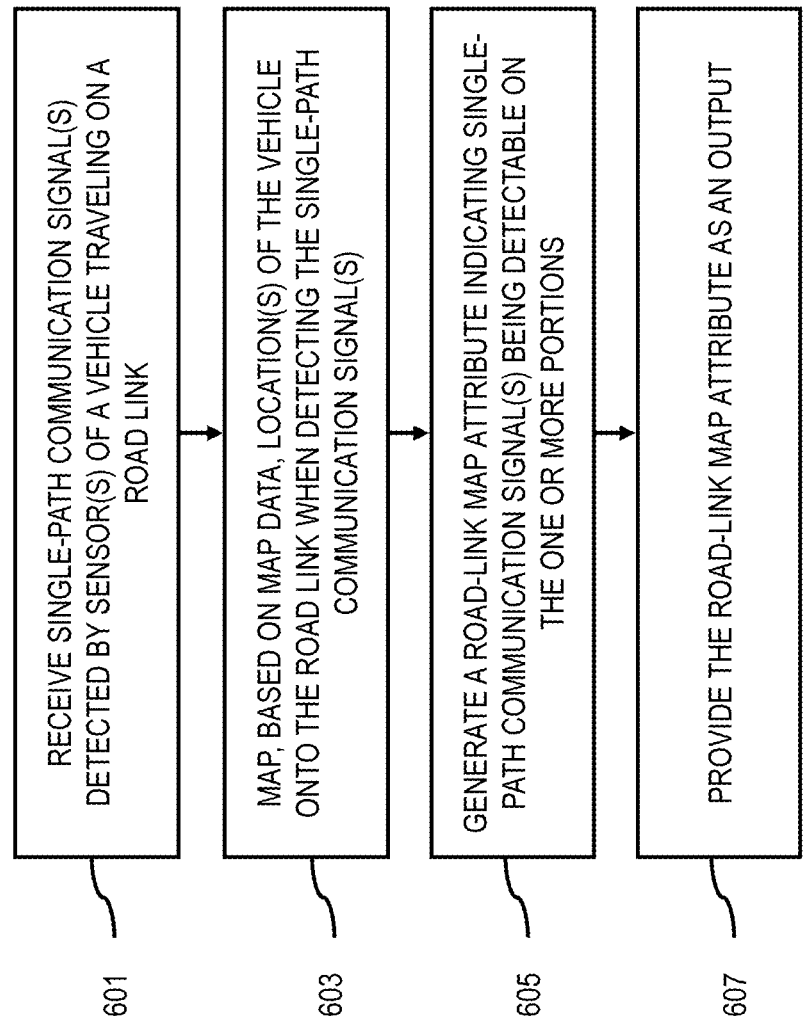
FIG. 6 is a flowchart of a process for determining single-path communication signal map data for road links at vehicle(s), according to example embodiment(s)

FIG. 6 is a flowchart of a process for determining single-path communication signal map data for road links at vehicle(s), according to example embodiment(s). In various embodiments, the mapping platform 107, the mapping application 113a, the machine learning system 123, and/or any of the modules 301-309 may perform one or more portions of the process 600 and may be implemented in, for instance, a chip set including a processor and a memory as shown in FIG. 10. As such, the mapping platform 107, the machine learning system 123, and/or the modules 301-309 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In one embodiment, in step 601, the data processing module 301 can receive one or more single-path communication signals (e.g., the 5G downlink signal(s) 203 in FIG. 2A) detected by one or more sensors (e.g., the sensor 105) of a vehicle (e.g., the vehicle 103a in FIG. 2A) traveling on a particular road link (e.g., the road link 201 in FIG. 2A).

In one embodiment, in step 603, the mapping module 303 can map, based on map data, one or more locations of the vehicle onto at least one or more portions (e.g., a portion between offset=a1 and offset=b1 and another portion between offset=c1 and offset=d1) of the particular road link (e.g., the road link 201) when detecting the one or more single-path communication signals. For instance, the map data can be downloaded (from a map database) and/or stored in a cloud.

In one embodiment, in step 605, the mapping module 303 can generate a road-link map attribute (e.g., (a1,b1);(c1,d1) in Table 1) indicating that one or more single-path communication signals (e.g., the 5G downlink signal(s) 203 in FIG. 2A) are detectable on the one or more portions.

In one embodiment, in step 607, the output module 309 can providing the road-link map attribute as an output (e.g., to the map database, the geographic database 121, etc.).

In one embodiment, the service quality module 305 can determine, based on one or more single-path communication signals (e.g., the 5G downlink signal(s) 203, the 5G uplink signal(s) 205, etc. in FIG. 2A), one or more quality of service measurements of the one or more single-path communication signals. For instance, the one or more quality of service measurements may include one or more download transmission speeds (e.g., based on the 5G downlink signal(s) 203), one or more upload transmission speeds (e.g., based on the 5G uplink signal(s) 205), one or more delay time periods, one or more ping time periods, one or more jitter measurements, or a combination thereof.

The data processing module 301 can then include the one or more quality of service measurements in one or more of the road-link map attributes (e.g., extending Table 1) or the coverage information (e.g., extending Table 2). As discussed, the quality of service measurements can be calculated by a 5G communication module in the vehicle 103a based on one or more single-path communication signals (e.g., the 5G downlink signal(s) 203 and/or 5G uplink signal(s) 205 in FIG. 2A) transmitted between the vehicle 103a and the access point 102.

In another embodiment, the data processing module 301 can determine the one or more portions (e.g., the 5G-covered portion between Offset=a and Offset=b) of the particular road link as one or more offsets from one or more nodes on the particular road link (e.g., the road link 201). The road-link map attribute (e.g., [a1,b1]; [c,d1]) includes the one or more offsets from the one or more nodes.

In yet another embodiment, the data processing module 301 can determine, based on one or more single-path communication signals (e.g., the 5G downlink signal(s) 203 and/or 5G uplink signal(s) 205 in FIG. 2A, the 3D beam-formed communication signal 225 in FIG. 2B, etc.), one or more signal strengths, one or more distances, one or more angles of incidence, one or more signal providers, or a combination thereof associated with one or more access points (e.g., the access point 102) that transmit the one or more single-path communication signals. The data processing module 301 can then include the one or more signal strengths, the one or more distances, the one or more angles of incidence, the one or more signal providers, or a combination thereof in one or more of the road-link map attribute or the coverage information (e.g., as shown in Table 3). For instance, the one or more angles of incidence can include one or more azimuth angles relative to the particular road link, one or more elevation angles relative to the one or more access points (e.g., the access point 102) located substantially nearby the particular road link (e.g., the road link 201, LinkID_X), or a combination thereof.

Figure 7A:
FIGS. 7A-7C are diagrams of example map user interfaces associated with single-path communication signal map data for road links, according to example embodiment(s)
Figure 7B:
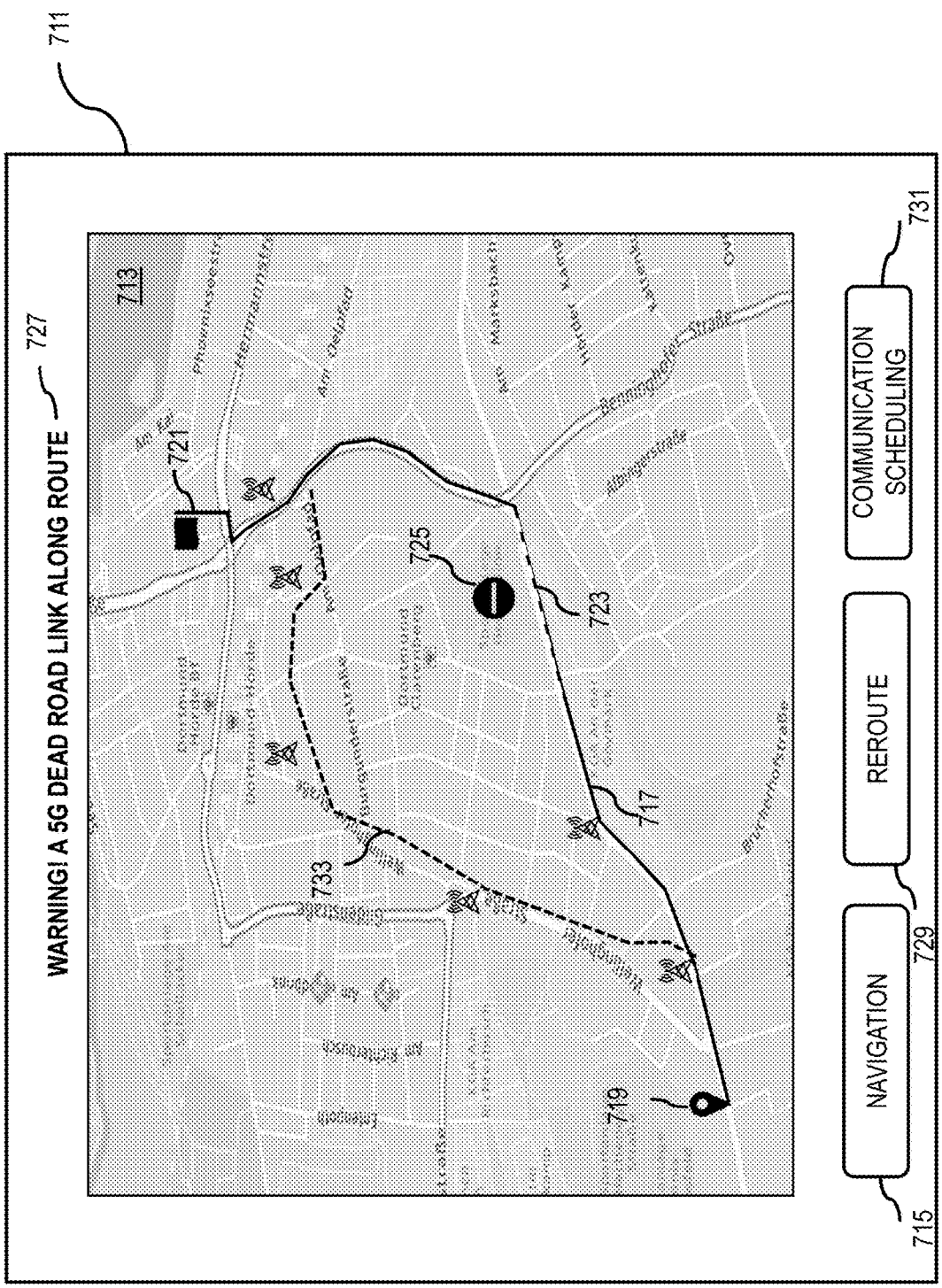
Figure 7C:
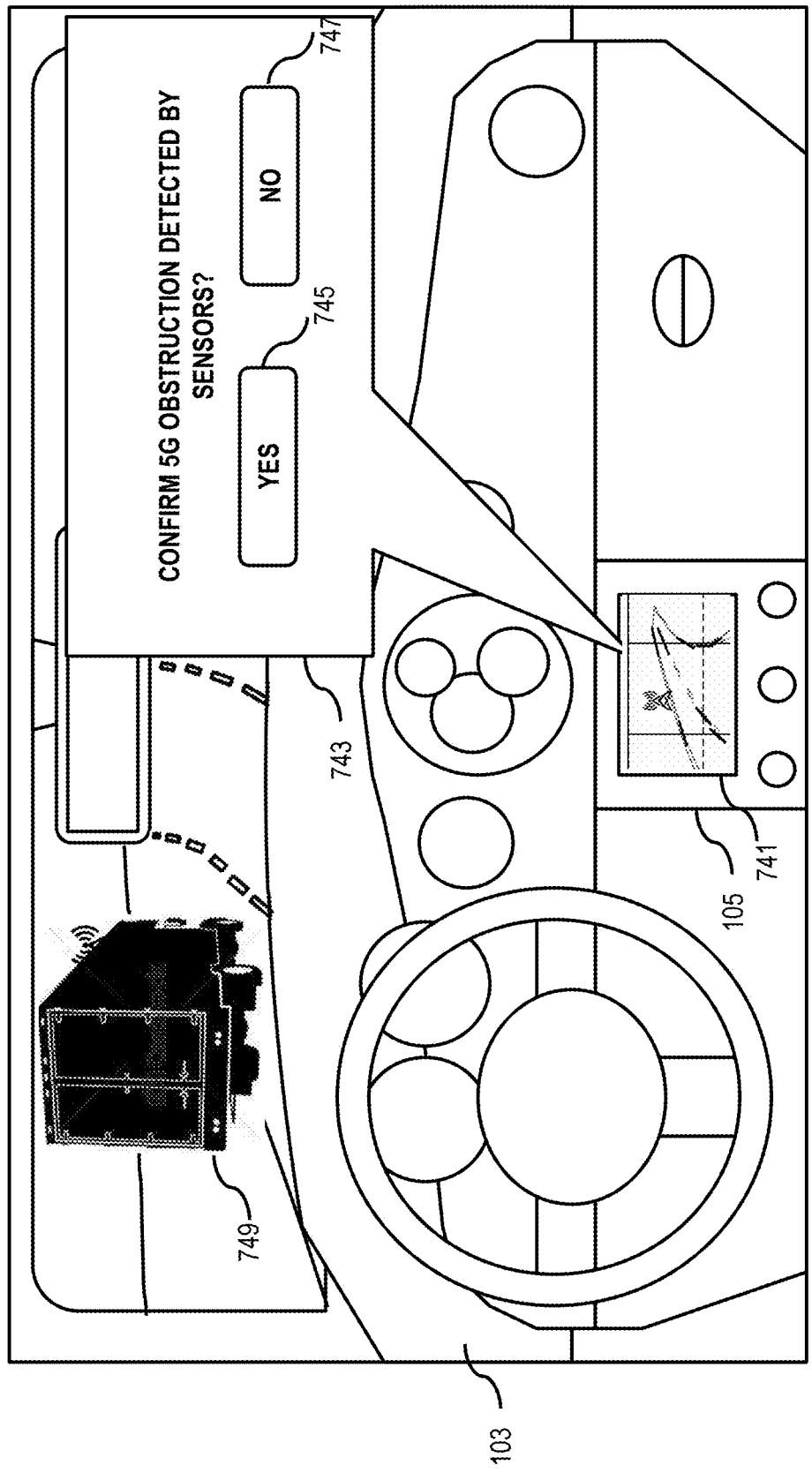

In one embodiment, the output module 309 can cause a representation on a user interface of one or more of the coverage information or at least one user action recommendation based on the coverage information. FIGS. 7A-7C are diagrams of example map user interfaces associated with single-path communication signal map data for road links, according to example embodiment(s). In another embodiment, the output module 309 working in conjunction with the mapping module 303 can generate a communication signal map layer based at least on the road-link map attribute.

In another embodiment, the output module 309 can retrieve aggregated road-link map attributes gathered and/or generated by the vehicle sensors 105 and/or the UEs 111 resulting from the travel of the UEs 111 and/or vehicles 103 on a road link of a road network. In this instance, a communication signal map layer stores a plurality of road-link map attributes generated by different vehicle sensors 105, UEs 111, applications 113, etc. over a period while traveling on a road link (e.g., a stretch of roadway where 5G signal is detected).

The output module 309 can then provide one or more of the coverage information or the communication signal map layer for communication scheduling, vehicle navigation, autonomous driving, communication load-balancing, fleet management, or a combination thereof. By way of example, the vehicles 103 can use the coverage information to establish a 5G connection with high bandwidth capacity and fast speed to support a range of use cases, such as vehicle navigation, autonomous driving, communication scheduling (e.g., gaming/streaming, virtual reality, artificial intelligence (AI), IoT applications, etc.), etc. In terms of vehicle navigation, the system 100 can calculate routes including road links with 5G signal coverage, to schedule data transmissions to occur when vehicles travelling on such road links (e.g., for movie streaming), etc.

In terms of communication load-balancing, the system 100 can analyze the current and/or historical coverage information to balance loads among access points covering one road link, access points covering an area of interest (e.g., a campus, a stadium, a theme park, a shopping district, etc.), etc., to maximize 5G network throughput.

In terms of fleet management, the system 100 can monitor the performance of the 5G communication modules of the fleet vehicles to schedule maintenance and/or replacement of the 5G communication modules. In addition, the system 100 can route the fleet vehicles to maximize 5G coverage en route and/or optimize communication scheduling.

Referring to FIG. 7A, in one embodiment, the system 100 can generate a user interface (UI) 701 (e.g., via the mapping platform 107) for a UE 111 (e.g., a mobile device, a smartphone, a client terminal, etc.) that can allow a user (e.g., a mapping service provider staff, a vehicle fleet operator staff, an end user, etc.) to see vehicle sensor data, single-path communication signal characteristics data, road-link map attribute data, filtered road-link map attribute data, single-path communication coverage information, quality of service measurement data, etc. currently and/or over time (e.g., an hour, a day, a week, a month, a year, etc.) in an area presented over a map 703. Upon selection of one or more of the road-link coverage options 705, the user can access the data based on the respective option(s). For instance, the signal coverage options 705 includes a 5G option 705a, a 4G option 705b, and a no-coverage option 705c. The 5G option 705a allows the user to view 5G covered road links determined as discussed. The 4G option 705b allows the user to view 4G covered areas determined based on known methods. The no-coverage option 705c allows the user to view areas not covered by 4G/5G.

In addition, the user can select a "Quality of Service" button 707 to 4G and/or 5G quality of service data in the map 703, or a "Load Balancing" button 709 to proceed with the load-balancing functions as discussed above.

FIG. 7B is a diagram of an example user interface (UI) 711 capable of presenting 5G coverage data, according to example embodiment(s). In this example, the UI 711 shown is generated for a UE 111 (e.g., a mobile device, an embedded navigation system of a vehicle 103, a client terminal, etc.) that includes a map 713. The UI 711 also presents an option of "navigation" 715 in FIG. 7B for a user to select and plan an optimal route. For instance, the system 100 can decide a fastest route 717 form a current user location 719 to a destination 721. However, the system 100 also determines based on 5G coverage information as discussed that the fastest route 717 includes a 5G-dead road link 723 (e.g., caused by an obstruction 725). In this case, the system 100 presents a notification 727 of "Warning! A 5G dead road link along route." The system 100 can prompt the user to select a "Reroute" button 729 or a "Communication scheduling" button 731 in response to the 5G dead road link. Accordingly, when the user selects the "Reroute" button 729, the system 100 can present an alternate route 733 based on the 5G coverage information to ensure the user will have sufficient 5G connection on the route. Alternatively, when the user selects the "Communication scheduling" button 731 to proceed with the fastest route 717, the system 100 will provide communication scheduling functions as discussed above, so the user and/or the vehicle 103 to pre-load data prior to reaching the 5G-dead road link 723.

In one instance, the UI 711 could also be presented via a headset, goggle, or eyeglass device used separately or in connection with a UE 111 (e.g., a mobile device). In one embodiment, the system 100 can present or surface the 5G coverage information, map data, traffic report data, etc. in multiple interfaces simultaneously (e.g., presenting a 2D map, a 3D map, an augmented reality view, a virtual reality display, or a combination thereof). In one embodiment, the system 100 could also present the 5G coverage information to the user through other media including but not limited to one or more sounds, haptic feedback, touch, or other sensory interfaces. For example, the system 100 could present the 5G coverage information through the speakers of a vehicle 103 carrying the user.

In FIG. 7C, the system 100 may provide interactive user interfaces (e.g., of UE 111 associated with the vehicle 103) for reporting temporary 5G signal obstruction(s) detected by vehicle sensors 105 (e.g., cameras, LiDAR, RADAR, ultrasonic, etc.) as discussed and confirmed via user inputs (e.g., crowd-sources). For instance, the confirmed data can be stored in the geographic database 121. In one scenario, a user interface (UI) 741 of the vehicle 103 depicts a 5G coverage diagram, and prompts the user with a popup 743: "Confirm 5G obstruction detected by sensors?" An operator and/or a passenger of the vehicle 103 can select a "yes" button 745 or a "no" button 747 based on the user's observation of a temporary 5G signal obstruction (e.g., a container truck 749).

For example, the user interface can present the UI 741 and/or a physical controller such as but not limited to an interface that enables voice commands, a pressure sensor on a screen or window whose intensity reflects the movement of time, an interface that enables gestures/touch interaction, a knob, a joystick, a rollerball or trackball-based interface, or other sensors. As other examples, the sensors can be any type of sensor that can detect a user's gaze, heartrate, sweat rate or perspiration level, eye movement, body movement, or combination thereof, in order to determine a user response to confirm road events. As such, the system 100 can enable a user to confirm temporary 5G signal obstructions to process as discussed.

The above-discussed embodiments can utilize vehicle sensor data and map data to create road-link map attributes indicating single-path communication signals being detectable on a road link or its portion(s). The road-link map attributes can support communication scheduling, vehicle navigation, automatous driving, communication load-balancing, fleet management, etc.

Returning to FIG. 1, in one embodiment, the mapping platform 107 performs the process for building single-path communication signal map data for road links as discussed with respect to the various embodiments described herein. As discussed, the mapping platform 107 can generate 5G-covered road-link/portion data based on machine learning.

In one embodiment, the mapping platform 107 has connectivity over the communications network 109 to the services platform 115 (e.g., an OEM platform) that provides the services 117. By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the mapping platform 107 to provide services such as navigation, mapping, other location-based services, etc.

As mentioned above, the vehicles 103, for instance, can a part of a sensor-based system for collecting sensor data for detecting actual 5G signals on a road link and/or in a road network. In particular, each vehicle 103 is configured to report sensor data as road-link map attributes (e.g., including a road link ID, offsets, etc.), which are individual data records collected at a point in time that records 5G signal data for that point in time. In one embodiment, the road link ID can be permanent. In another embodiment, the road link ID is valid for a certain period of time, for example, to control data access and security.

In other embodiments, a road-link map attributes can additionally include one or more attributes such as: (1) 5G communication provider ID, (2) signal strength, (3) estimated distance from an access point, (4) azimuth angle from the access point, (5) elevation angle from the access point, (6) time, etc. The list of attributes is provided by way of illustration and not limitation. Accordingly, it is contemplated that any combination of these attributes or other attributes may be recorded as a road-link map attribute. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

In one embodiment, the mapping platform 107 may be a platform with multiple interconnected components. The mapping platform 107 may include multiple servers, intelligent networking devices, computing devices, components, and corresponding software for providing parametric representations of lane lines. In addition, it is noted that the mapping platform 107 may be a separate entity of the system 100, a part of the services platform 115, a part of the one or more services 117, or included within a vehicle 103 (e.g., an embedded navigation system).

In one embodiment, content providers 119 may provide content or data (e.g., including sensor data (e.g., including 5G signal data), road closure reports, probe data, expected vehicle volume data, etc.) to the mapping platform 107, the UEs 111, the applications 113, the services platform 115, the services 117, the geographic database 121, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the mapping platform 107, the services platform 115, the services 117, the geographic database 121, and/or the vehicles 103. In another embodiment, the content providers 119 may manage access to a central repository of data, and offer a consistent, standard interface to data, such as a repository of the geographic database 121.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the mapping platform 107 to build single-path communication signal map data for road links.

In one embodiment, the vehicles 103 are configured with various sensors (e.g., vehicle sensors 105) for generating or collecting sensor data, probe data, related geographic/map data, etc. In one embodiment, the sensed data represents sensor data associated with a geographic location or coordinates at which the sensor data was collected (e.g., a latitude and longitude pair). In one embodiment, the sensor data includes location data collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road segments of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 125 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating sensor data and/or probe data associated with a vehicle 103, a driver, a passenger, other vehicles, conditions regarding the driving environment or roadway, etc. For example, such sensors may be used as GPS receivers for interacting with the one or more satellites 125 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as sensor data (e.g., including 5G signal data) according to other known wireless communication protocols. For example, each UE 111, application 113, user, and/or vehicle 103 may be assigned a unique probe identifier (source ID) for use in reporting or transmitting the 5G signal data collected by the vehicles 103 and/or UEs 111. In one embodiment, each vehicle 103 and/or UE 111 is configured to report 5G signal data as road-link map attributes, which are individual data records collected at a point in time that records telemetry data.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G/5G New Radio networks (5G NR), Narrowband Internet-of-Things networks (NB-IoT), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, mapping platform 107, UEs 111, applications 113, services platform 115, services 117, content providers 119, and/or satellites 125 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
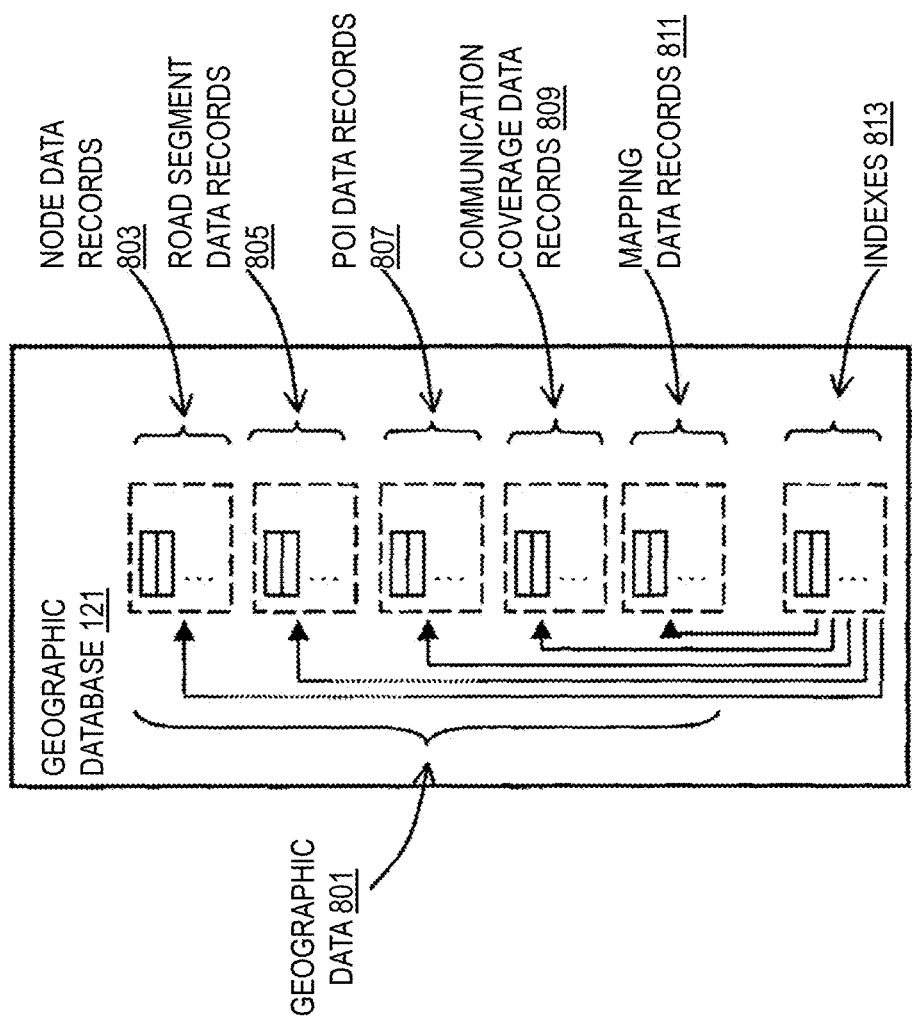
FIG. 8 is a diagram of a geographic database, according to example embodiment(s)

FIG. 8 is a diagram of a geographic database (such as the database 121), according to example embodiment(s). In one embodiment, the geographic database 121 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 121 include high resolution or high definition (HD) mapping data that provide centimeter-level or better accuracy of map features. For example, the geographic database 121 can be based on Light Detection and Ranging (LiDAR) or equivalent technology to collect billions of 3D points and model road surfaces and other map features down to the number lanes and their widths. In one embodiment, the mapping data (e.g., mapping data records 811) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 803, road segment or link data records 805, POI data records 807, communication coverage data records 809, mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 121. In one embodiment, the indexes 813 may be used to quickly locate data without having to search every row in the geographic database 121 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 807. The geographic database 121 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 121 can also include communication coverage data records 809 for storing vehicle sensor data, single-path communication signal characteristics data, road-link map attribute data, filtered road-link map attribute data, single-path communication coverage information, quality of service measurement data, training data, prediction models, annotated observations, computed featured distributions, sampling probabilities, and/or any other data generated or used by the system 100 according to the various embodiments described herein. By way of example, the communication coverage data records 809 can be associated with one or more of the node records 803, road segment records 805, and/or POI data records 807 to support localization or visual odometry based on the features stored therein and the corresponding estimated quality of the features. In this way, the communication coverage data records 809 can also be associated with or used to classify the characteristics or metadata of the corresponding records 803, 805, and/or 807.

In one embodiment, as discussed above, the mapping data records 811 model road surfaces and other map features to centimeter-level or better accuracy. The mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 811 are divided into spatial partitions of varying sizes to provide mapping data to vehicles 103 and other end user devices with near real-time speed without overloading the available resources of the vehicles 81 and/or devices (e.g., computational, memory, bandwidth, etc. resources).

In one embodiment, the mapping data records 811 are created from high-resolution 3D mesh or point-cloud data generated, for instance, from LiDAR-equipped vehicles. The 3D mesh or point-cloud data are processed to create 3D representations of a street or geographic environment (including map objects, such as buildings) at centimeter-level accuracy for storage in the mapping data records 811.

In one embodiment, the mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like. In one embodiment, certain attributes, such as lane marking data records, mapping data records and/or other attributes can be features or layers associated with the link-node structure of the database.

In one embodiment, the geographic database 121 can be maintained by the content providers 119 in association with the services platform 115 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicles 103 along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 81 or a user terminal 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for building single-path communication signal map data for road links may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
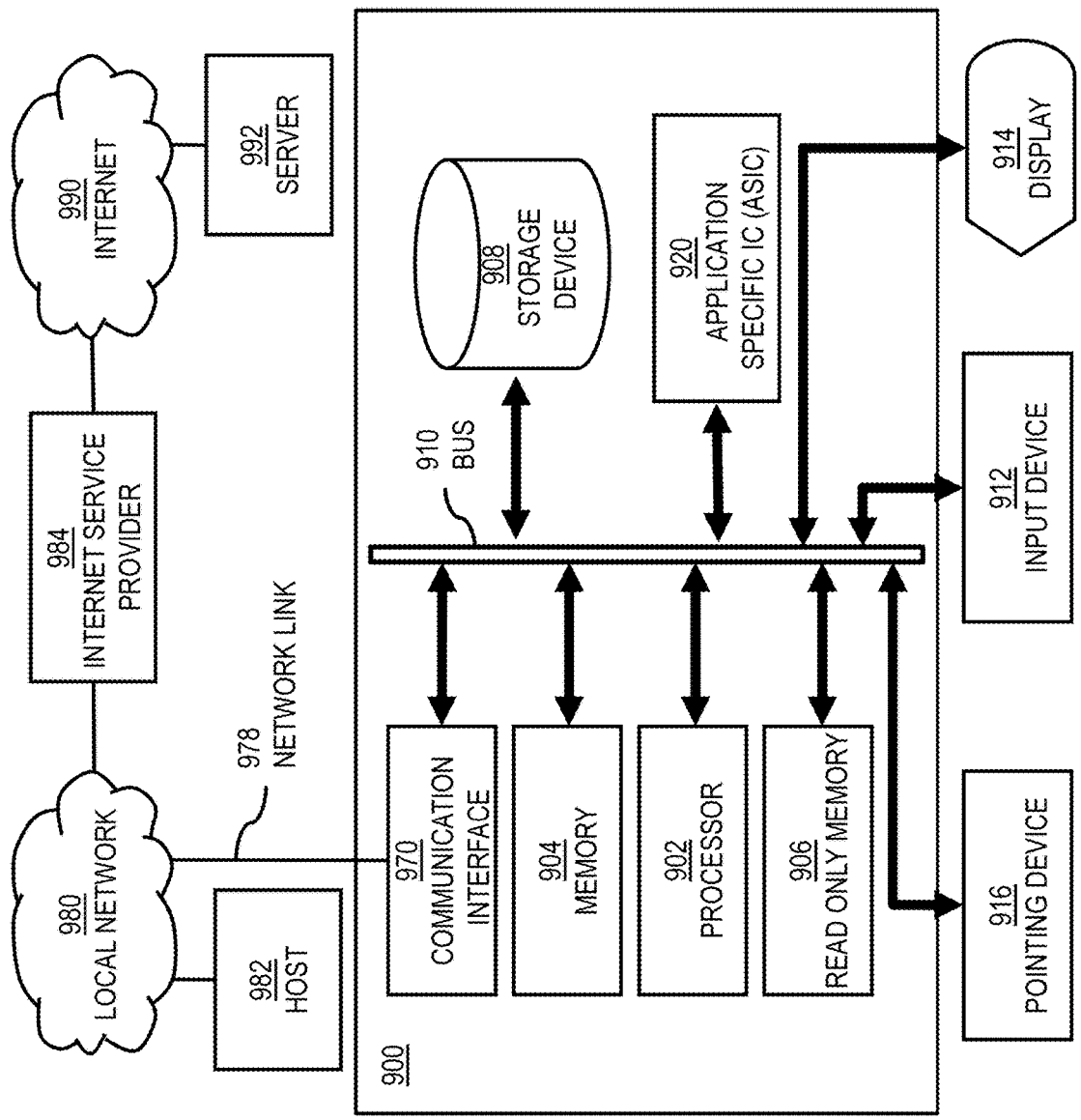
FIG. 9 is a diagram of hardware that can be used to implement example embodiment(s)

FIG. 9 illustrates a computer system 900 upon which an embodiment of the invention may be implemented. Computer system 900 is programmed (e.g., via computer program code or instructions) build single-path communication signal map data for road links as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to building single-path communication signal map data for road links. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RANI) or other dynamic storage device, stores information including processor instructions for building single-path communication signal map data for road links. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for building single-path communication signal map data for road links, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for building single-path communication signal map data for road links.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed build single-path communication signal map data for road links as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein build single-path communication signal map data for road links. The memory 1005 also stores the data associated with or generated by the execution of the inventive steps.

FIG. 11 is a diagram of exemplary components of a mobile terminal 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 build single-path communication signal map data for road links. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    using, by one or more processors, one or more of map data or vehicle sensor data to make a determination that one or more single-path communication signals are detectable on a particular road link or on one or more portions thereof;
    determining the one or more portions of the particular road link as one or more offsets from one or more nodes on the particular road link based on the determination and the one or more offsets, generating or storing, by the one or more processors, a road-link map attribute indicating that one or more single-path communication signals are detectable on the particular road link or on the one or more portions thereof with respect to the one or more offsets from the one or more nodes; and
    based at least on the road-link map attribute, providing, by the one or more processors, coverage information indicating that one or more single-path communication signals are detectable on the particular road link or on the one or more portions thereof.

2. The method of claim 1, wherein a given single-path communication signal has line-of-sight to the particular road link or at least to one of the one or more portions of the particular road link.

3. The method of claim 1, further comprising:
    determining, based on one or more single-path communication signals, one or more signal strengths, one or more distances, one or more angles of incidence, one or more signal providers, or a combination thereof associated with one or more access points that transmit the one or more single-path communication signals; and including the one or more signal strengths, the one or more distances, the one or more angles of incidence, the one or more signal providers, or a combination thereof in one or more of the road-link map attribute or the coverage information.

4. The method of claim 3, wherein the one or more angles of incidence include one or more azimuth angles relative to the particular road link, one or more elevation angles relative to the one or more access points located substantially nearby the particular road link, or a combination thereof.

5. The method of claim 1, wherein the generating or storing comprises:

receiving and storing the road-link map attribute respectively generated at one or more vehicles; and aggregating the stored road-link map attribute into an aggregated map attribute for the particular road link, and wherein the providing of the coverage information is based on the aggregated map attribute.

6. The method of claim 1, further comprising:

receiving the vehicle sensor data from one or more vehicles, wherein the vehicle sensor data indicates one or more quality of service measurements of one or more single-path communication signals detected at the one or more vehicles, wherein the one or more quality of service measurements include one or more download transmission speeds, one or more upload transmission speeds, one or more delay time periods, one or more ping time periods, one or more jitter measurements, or a combination thereof; and including the one or more quality of service measurements in one or more of the road-link map attribute or the coverage information.

7. The method of claim 1, wherein the using comprises:

determining, based on the map data, one or more access points located substantially nearby the particular road link;

estimating line-of-sight information by projecting propagation of one or more single-path communication signals from the one or more access points to at least the one or more portions of the particular road link, wherein the road-link map attribute is generated further based on the line-of-sight information.

8. The method of claim 7, wherein the using further comprises:

determining, based on the map data, at least one object located substantially nearby the particular road link, wherein the projecting accounts for presence of the at least one object.

9. The method of claim 1, wherein the one or more single-path communication signals include one or more millimeter wave signals, high-band 5G signals, laser light signals, or visible light signals.

10. The method of claim 1, wherein the providing comprises:

causing a representation on a user interface of one or more of the coverage information or at least one user action recommendation based on the coverage information.

11. The method of claim 1, wherein the providing comprises:

generating a communication signal map layer based at least on the road-link map attribute; and providing one or more of the coverage information or the communication signal map layer for communication scheduling, vehicle navigation, autonomous driving, communication load balancing, fleet management, or a combination thereof.

12. An apparatus comprising:

at least one processor; and at least one memory including computer program code for one or more programs, the at least one memory and the computer program code configured to, with the at least one processor, cause the apparatus to perform at least the following:

receive location data of one or more access points that are located substantially nearby a particular road link;

determine based on map data at least one object located substantially nearby the particular road link estimate, based on the map data, line-of-sight information by projecting propagation of one or more single-path communication signals from the one or more access points to at least one or more portions of the particular road link accounting for presence of the at least one object;

generate a road-link map attribute indicating that one or more single-path communication signals are detectable on the one or more portions; and based at least on the road-link map attribute, provide coverage information indicating that one or more single-path communication signals are detectable on the one or more portions.

13. The apparatus of claim 12, wherein the apparatus is further caused to:

determine the one or more portions of the particular road link as one or more offsets from one or more nodes on the particular road link, wherein the road-link map attribute includes the one or more offsets from the one or more nodes.

14. The apparatus of claim 12, wherein the apparatus is further caused to:

determine, based on one or more single-path communication signals, one or more signal strengths, one or more distances, one or more angles of incidence, one or more signal providers, or a combination thereof; and include one or more signal providers, the one or more signal strengths, the one or more distances, the one or more angles of incidence, the signal provider data, or a combination thereof in one or more of the road-link map attribute or the coverage information.

15. A non-transitory computer-readable storage medium carrying one or more sequences of one or more instructions which, when executed by one or more processors, cause an apparatus to perform:

receiving one or more single-path communication signals detected by one or more sensors of a vehicle traveling on a particular road link;

mapping, based on map data, one or more locations of the vehicle onto at least one or more portions of the particular road link when detecting the one or more single-path communication signals;

generating a road-link map attribute indicating that one or more single-path communication signals are detectable on the one or more portions;

determining, based on one or more single-path communication signals, one or more quality of service measurements of the one or more single-path communication signals; and including the one or more quality of service measurements in one or more of the road-link map attribute; and providing the road-link map attribute as an output.

16. The non-transitory computer-readable storage medium of claim 15, wherein the apparatus is caused to further perform:

determining, based on one or more single-path communication signals, one or more signal strengths, one or more distances, one or more angles of incidence, one or more signal providers, or a combination thereof associated with one or more access points that transmit the one or more single-path communication signals; and including the one or more signal providers, the one or more signal strengths, the one or more distances, the one or more angles of incidence, the one or more signal providers, or a combination thereof in the road-link map attribute.

17. The non-transitory computer-readable storage medium of claim 15, wherein the one or more quality of service measurements include one or more download transmission speeds, one or more upload transmission speeds, one or more delay time periods, one or more ping time periods, one or more jitter measurements, or a combination thereof.

18. A non-transitory computer-readable storage medium carrying one or more sequences of one or more instructions which, when executed by one or more processors, cause an apparatus to perform:

receiving one or more single-path communication signals detected by one or more sensors of a vehicle traveling on a particular road link;

mapping, based on map data, one or more locations of the vehicle onto at least one or more portions of the particular road link when detecting the one or more single-path communication signals;

generating a road-link map attribute indicating that one or more single-path communication signals are detectable on the one or more portions;

determining the one or more portions of the particular road link as one or more offsets from one or more nodes on the particular road link, wherein the road-link map attribute includes the one or more offsets from the one or more nodes; and providing the road-link map attribute as an output.

19. A non-transitory computer-readable storage medium carrying one or more sequences of one or more instructions which, when executed by one or more processors, cause an apparatus to perform:

receiving one or more single-path communication signals detected by one or more sensors of a vehicle traveling on a particular road link;

mapping, based on map data, one or more locations of the vehicle onto at least one or more portions of the particular road link when detecting the one or more single-path communication signals;

generating a road-link map attribute indicating that one or more single-path communication signals are detectable on the one or more portions;

determining, based on one or more single-path communication signals, one or more quality of service measurements of the one or more single-path communication signals, wherein the one or more quality of service measurements include one or more download transmission speeds, one or more upload transmission speeds, one or more delay time periods, one or more ping time periods, one or more jitter measurements, or a combination thereof;

including the one or more quality of service measurements in one or more of the road-link map attribute; and providing the road-link map attribute as an output.

\* \* \* \* \*